(12) United States Patent
Redington

(10) Patent No.: US 6,575,046 B1
(45) Date of Patent: Jun. 10, 2003

(54) AIR MASS FLOW MEASURING DEVICE AND METHOD OF USE

(75) Inventor: Gordon F. Redington, Maplewood, MN (US)

(73) Assignee: AAF-McQuay Inc., Minneapolis, MN (US)

( * ) Notice: Subject to any disclaimer, the term of this patent is extended or adjusted under 35 U.S.C. 154(b) by 0 days.

(21) Appl. No.: 09/504,460

(22) Filed: Feb. 16, 2000

Related U.S. Application Data
(60) Provisional application No. 60/121,926, filed on Feb. 26, 1999.

(51) Int. Cl.[7] ............................................. G01F 1/28
(52) U.S. Cl. ..................................... 73/861.74; 73/861
(58) Field of Search ......................... 73/861.74, 861.73, 73/861.71

(56) References Cited

U.S. PATENT DOCUMENTS

| | | | |
|---|---|---|---|
| 4,147,298 A | * | 4/1979 | Leemhuis .................. 236/49.4 |
| 4,270,694 A | * | 6/1981 | Knauth ..................... 236/49.3 |
| 4,334,648 A | | 6/1982 | Buth et al. |
| 5,372,544 A | * | 12/1994 | Gervais ..................... 454/256 |
| 5,860,592 A | * | 1/1999 | Dozier et al. .............. 236/49.3 |

FOREIGN PATENT DOCUMENTS

JP        04-143544    * 5/1992   ............ F24F/13/10

* cited by examiner

*Primary Examiner*—Hezron Williams
*Assistant Examiner*—Andre Allen
(74) *Attorney, Agent, or Firm*—Patterson, Thuente, Skaar & Christensen, P.A.

(57) ABSTRACT

A flow measuring device for use with a heating, ventilation and air-conditioning (HVAC) system includes a vane being positionable in an airstream, the vane being rotatably positionable between a first minimum air mass flow disposition and a second maximum air mass flow disposition, the vane being biased in the first minimum air mass flow disposition, the disposition of the vane being responsive in part to an impingement of an air mass flow on the vane. A measuring device is operably coupled to the vane for measuring the disposition of the vane and for providing an output communication of the vane disposition, the vane disposition having a known relationship to the air mass flow. A method of use of the flow measuring device and calibration of the flow measuring device are included.

46 Claims, 16 Drawing Sheets

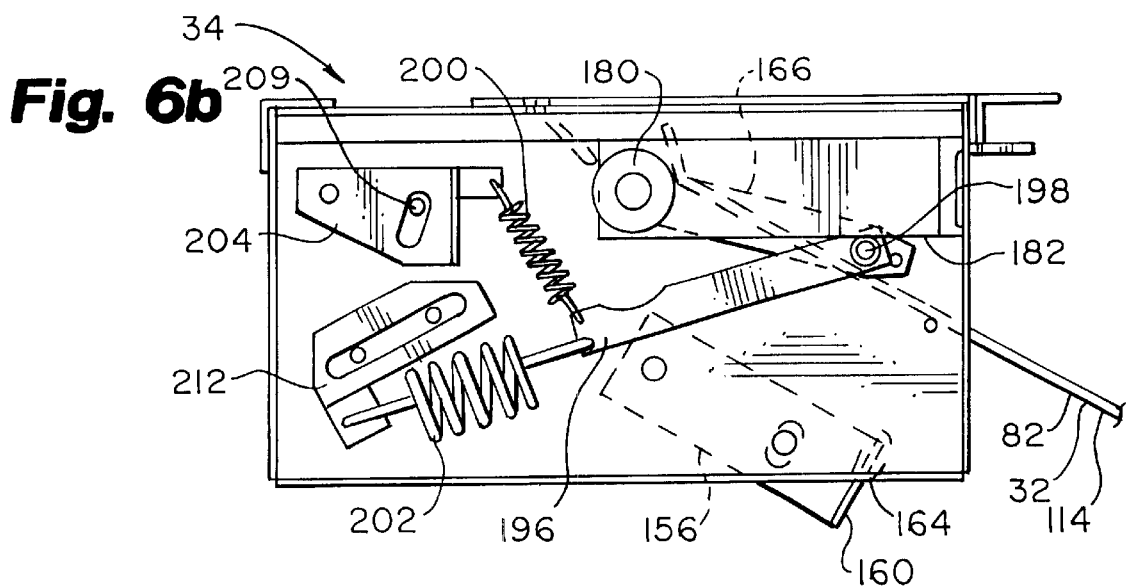
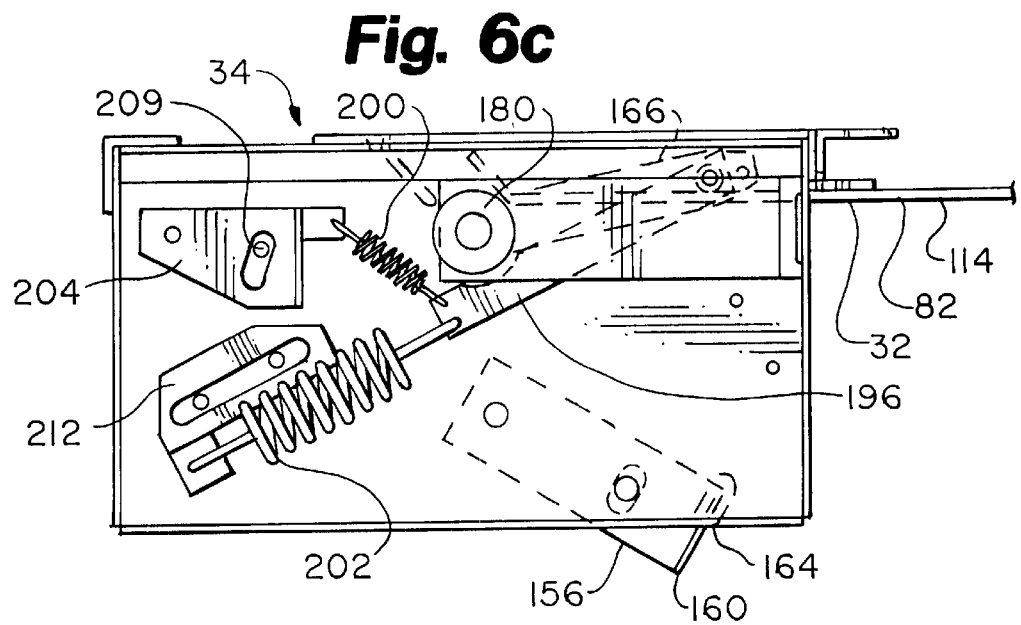
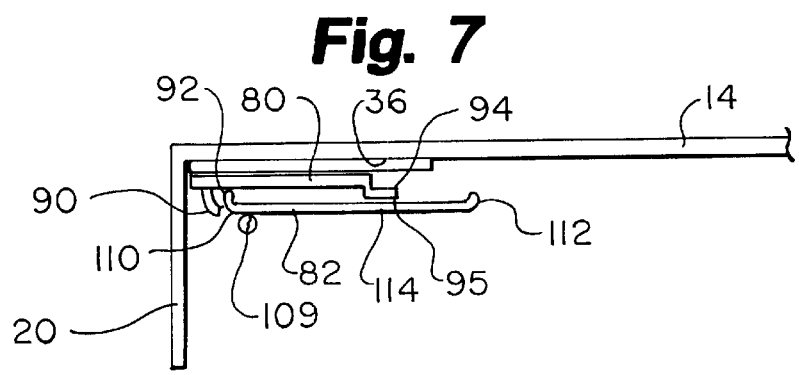

AIR MASS FLOW MEASURING DEVICE AND METHOD OF USE

RELATED APPLICATION

This application claims the benefit of U.S. Provisional Application No. 60/121,926, filed Feb. 26, 1999, incorporated herein in its entirety by reference.

TECHNICAL FIELD

The present invention relates to heating, ventilation and air-conditioning (HVAC) systems. More particularly, the present invention relates to variable air volume HVAC systems.

BACKGROUND OF THE INVENTION

Increased emphasis is being placed in the quality of air within occupied buildings, and therefore increased emphasis is being placed on introducing the correct amount of outdoor air into those buildings. The trend toward "tighter" buildings has resulted in less outdoor air infiltrating into buildings, making it more important that the mechanical ventilation systems introduce the specified amount of outdoor air.

The task of consistently introducing the specified amount of outdoor air into a building is complicated by the fact that many mechanical ventilation systems are the variable air volume type (VAV). On VAV systems, the air delivery volume drawn in by the fans changes. Fan speed is varied and therefore the negative pressure those fans create at the inlet to the outdoor air intake damper also changes. The amount of outdoor air that will be drawn in through the outdoor air damper is dependent on two things: how far open the damper is, and the negative pressure generated by the fans at the damper inlet. If a consistent volume of outdoor air is to be drawn into the building, the damper open position must change whenever the negative pressure at that damper intake changes.

A proposed draft of ASHRAE Standard 62-1989R has included Section 5.6.9.1 to deal with the problem of bringing in the specified cubic feet per minute (CFM) of outdoor air with a VAV system. That section stated, "Variable air volume systems (except those supplying 100 percent outdoor air) shall include controls and devices to measure outdoor air mass flow at the air handler and designed to maintain outdoor air mass flow not less than 90 percent of required level over the expected supply air operating range." Although this revised standard is still in the proposal stage, the requirement for direct measurement of outdoor air is showing up in project specifications. Accordingly, there is a present need in the industry for an accurate air mass flow measuring device, especially being accurate at relatively low air mass flow rates.

Products are now on the market that attempt to measure and control outdoor air CFM using a calculation based on a measurement of velocity, velocity pressure, or louver pressure drop static pressure. Outdoor air mass flow volume is calculated by using that measured air velocity or velocity pressure and an equivalent duct area, or by using the measured static pressure drop across the outdoor air intake louver and typical louver pressure drop characteristics. In reality, the velocity pressures or static pressures encountered at the outdoor air intake are so low at the minimum outdoor air mass flows that need to be measured, that it is not reasonable to use them for what is supposed to be an accurate measurement. To accurately measure air velocities, ideal conditions must exist, such as long, straight duct runs and uniform air velocities throughout that.duct and known air densities. The outdoor air intake on a typical roof-mounted air handling unit will have a tortuous, turbulent outdoor air mass flow path, widely varying temperatures, changing barometric pressures, and varying wind conditions, which cumulatively make it unsuitable for the aforementioned existing type of measurement techniques. It becomes increasingly difficult to accurately measure air mass flow rates as that air mass flow rate is reduced. The purpose of measuring the air mass flow rate is to be sure that the flow rate does not get below the specified minimum at that low end of its range, typically 10 to 20 percent of the maximum air mass flow rate.

SUMMARY OF THE INVENTION

CONTROLLING FLOW OF OUTDOOR AIR: To deliver the specified volume of outdoor air to the building, the present invention measures outdoor air CFM flow rate, and controls the position of the outdoor air damper to maintain the specified CFM flow rate.

The present invention is a sensing vane that is rotatably displaced by the impingement and flow of an air stream across it. That vane repeatedly and accurately assumes a position according to the mass of air flowing across it. The "vane positions" are translated into air mass flow readings of "standard air" (0.075 lbs./cu. ft.). Therefore, vane position readings always indicate "standard air" because the vane is responding to air mass flow that is, air weight (mass) rather than air volume.

On this illustrative version of the device, the air mass flow that causes displacement of the vane is opposed by a combination of two springs and gravity. Alternative models can use other combinations of springs and gravity, or only gravity, or only springs.

There are many ways to translate the vane position to an air mass flow reading. A simple way would be to have the vane align with a suitable marked scale and directly read air mass flow. Another way is to have the vane position control an electrical signal such that the electrical signal can be translated into an air mass flow reading. Connecting the vane to a potentiometer is one way to accomplish that result.

Through tests we have determined that the displacement of the vane of the present invention accurately and repeatedly indicates the air mass flow.

SENSING VANE: The sensing vane of the present invention functions according to the principals described here but it is adapted to meet the requirements for specific applications. The application will influence the vane size, location, and orientation. The vane adaptation in this illustration is tall and narrow, with a vertical pivot axis Alternatively, a vane could be long and narrow on a horizontal axis to be compatible with horizontal ductwork or arranged for vertical air mass flow.

It is important that the blade rotational friction be minimized. It must be free-swinging to respond to small forces. In this case, virtually all of the weight of the vane is on the lower hinge. The lower hinge or pivot is essentially a conical recess that rests atop and pivots on a fixed, sharp point in order to minimize rotational friction. The upper bearing is a nylon or other minimal friction bushing that keeps the pivot axis in alignment but has little static force on it.

This sensing vane does not add measurable pressure drop to the outside air intake path. At minimum air mass flow, the vane is somewhat perpendicular to air mass flow, but because of the low flow rate there is not a measurable pressure drop. As air mass flow increases, the vane rotates, becoming increasingly more parallel with the air mass flow path and eventually reaching a position where it has swung parallel with and proximate the backwall of the outdoor air intake, essentially out of the air path.

The vane is mounted to a vertical support that is attached to the backwall of the outdoor air intake. That vertical support includes a leading edge lip that overlaps and protects the leading edge of the vane from air mass flow impingement. That lip prevents a turbulent, high-velocity air stream from getting behind the vane (between the vane and the air intake backwall) and causing the vane to flutter.

SPRINGS: Optimum accuracy will result if the Vane Position vs CFM relationship is characterized such that similar changes in CFM will result in similar changes in the vane position, indicating a linear relationship. Generally, very light air mass flow forces must move the vane near the minimum air mass flow position, building up to heavy force near mid-rotation, and then dropping back as the maximum air mass flow position is approached. On spring versions of the present invention, the desired linearity is accomplished by the selection and levering of the springs to act against the forces at various points of vane rotation.

The exemplary embodiment uses springs to oppose the movement of the vane. Two extension springs oppose the force of the air mass flow against the vane. The springs and link arms are such that, at very low air mass flows, only a light spring opposes vane displacement. As the air mass flow increases, the force on the vane increases and, correspondingly, a second, heavier spring engages. As the air mass flow increases further, the leverage working with that heavier spring changes, reducing the rate of increase with which the heavier spring opposes further vane movement. This is necessary because, as the vane becomes less perpendicular to air mass flow (more nearly parallel to the intake backwall), it takes less proportional spring force to oppose the air mass flow induced vane displacement.

Extension springs normally have two ratings: the spring "Rate" and the "Initial Tension." Coil extension springs are normally wound with adjacent coils in contact with each other when in the relaxed condition. The force to separate the coils is the Initial Tension. The application of springs for the device of the present invention requires precision springs. Spring manufacturers have a difficult time maintaining an accurate and consistent Initial Tension. Therefore, we have these springs "Open Wound" so there is no coil contact when the spring is relaxed and accordingly, there is no Initial Tension. Further, the required accuracy for the spring Rate is specified.

SENSOR POTENTIOMETER: A rotary potentiometer may be advantageously used as the vane position sensor in the exemplary device. The potentiometer shaft can be direct-coupled to the vane shaft. The potentiometer is then essentially mounted by its shaft to the vane. A thin, flexible bracket is used to restrain the body of the potentiometer from rotating, but allow the sensor to free-float in any direction, thus the potentiometer is self-aligning with the vane and free from binding forces.

CALIBRATION: A preferred embodiment uses a vane that is primarily influenced by pre-adjusted precision springs, except at minimum air mass flows. Accurate low air mass flow measurement results require that, after installation, the vane assembly be accurately leveled so the gravity effect on the vane will be correct. This may be accomplished by using a miniature cable and a weight. The miniature cable is horizontal, with one end attached perpendicular to and near the outer edge of the vane. The other end of the cable is anchored to the backwall of the intake cabinet. When a calibration weight is hung at the center of the cable, it places a known force on the vane, a force on the blade that is equivalent to the force caused by a specific air mass flow. With that weight in place, the vane assembly is leveled, being adjusted to a position that will result in the appropriate CFM reading from the sensor for the known calibration weight.

In an alternative embodiment, calibration is accomplished by using a weight and lever device. The weight causes a known force to be applied against the vane and at a specific location. That force on the vane at that location is equivalent to the force caused by a specific air mass flow when the unit is correctly leveled. With the weight and lever device in place, the vane assembly is leveled, being adjusted to a position that will result in the appropriate CFM reading from the sensor for the known calibration weight.

The present invention is a flow measuring device for use with a heating, ventilation and air-conditioning (HVAC) system and includes a vane being positionable in an airstream, the vane being rotatably positionable between a first minimum air mass flow disposition and a second maximum air mass flow disposition, the vane being biased in the first minimum air mass flow disposition, the disposition of the vane being responsive in part to an impingement of an air mass flow on the vane. A measuring device is operably coupled to the vane for measuring the disposition of the vane and for providing an output communication of the vane disposition, the vane disposition having a known relationship to the air mass flow. A method of use of the flow measuring device and calibration of the flow measuring device are included in the present invention.

BRIEF DESCRIPTION OF THE DRAWINGS

FIGS. 6a–6c are top plan form views of the sensing unit and vane assembly commencing at the minimum air mass flow disposition in FIG. 6a and progressing to the maximum air mass flow disposition in FIG. 6c;

FIG. 7 is a top plan form view of the vane assembly disposed relative to the vane support assembly;

FIG. 10b is an elevational view of an embodiment of the present invention depending from the upper wall of a rectangular duct as viewed from the left in FIG. 10a;

DETAILED DESCRIPTION OF THE PREFERRED EMBODIMENTS

The air mass flow measuring device of the present invention is shown generally at 10 in the figures. Like numbers in the various figures denote like components of the air mass flow measuring device 10. The air mass flow measuring device 10 is designed to measure air mass flow in an outdoor air intake or other duct. The outdoor air intake typically provides a source of ambient air to a heating ventilation air conditioning (HVAC) system.

Figure 1:
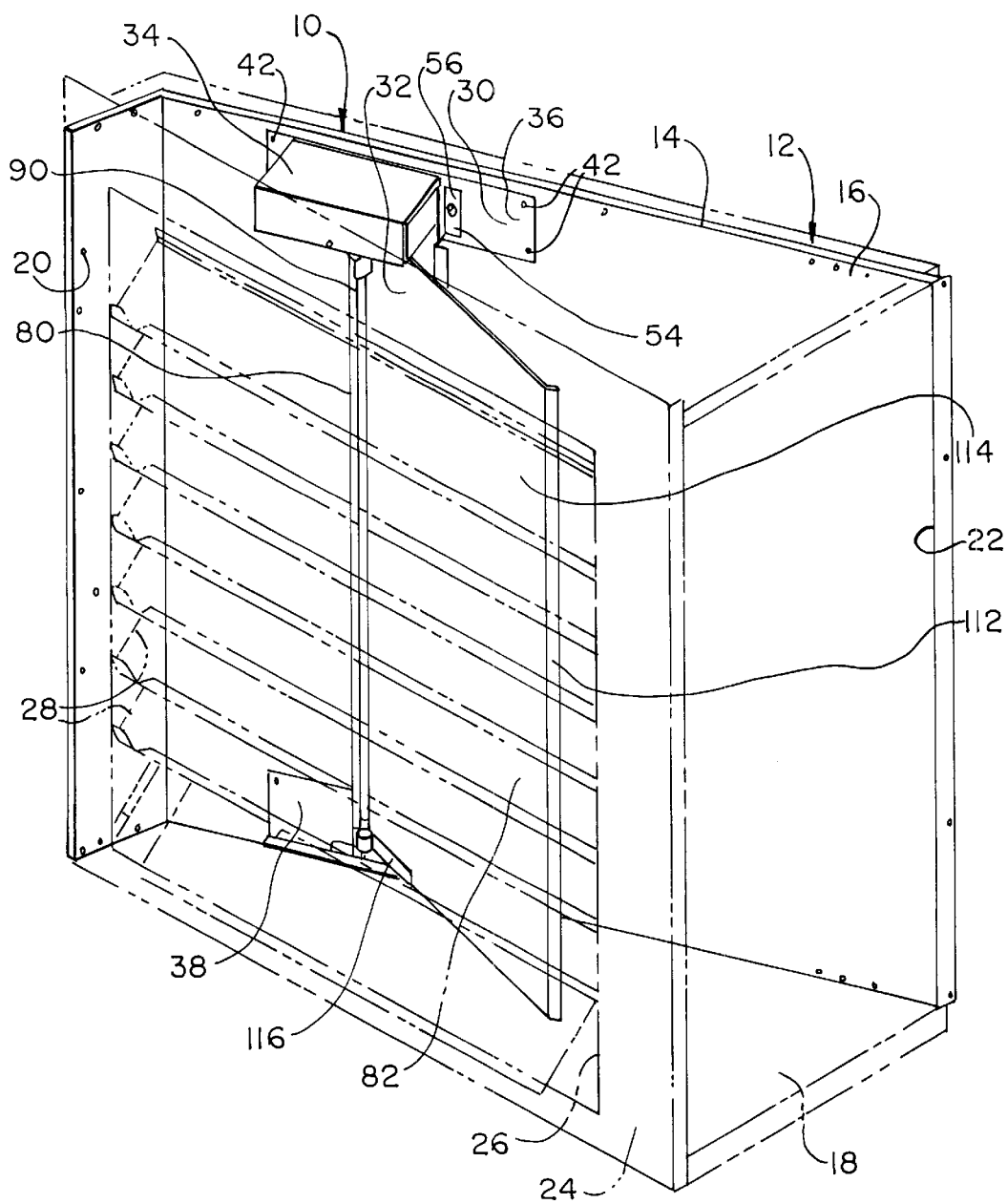
FIG. 1 is a perspective view of the air mass flow measuring device of the present invention installed in an exemplary inlet.

An exemplary outdoor air intake is depicted at 12 of FIG. 1. The outdoor air intake 12 has a generally planar backwall 14 and a top 16 and opposed bottom 18. A sidewall 20 is disposed opposite a side opening 22. A front wall 24 defines a front opening 26. A plurality of louvers 28 are typically disposed in the front opening 26. Ambient air typically flows into the front opening 26 past the air mass flow measuring device 10 and exits the outdoor air intake 12 through the side opening 22. The side opening 22 is typically ducted to the HVAC system for the delivery of an air mass flow thereto.

Figure 2:
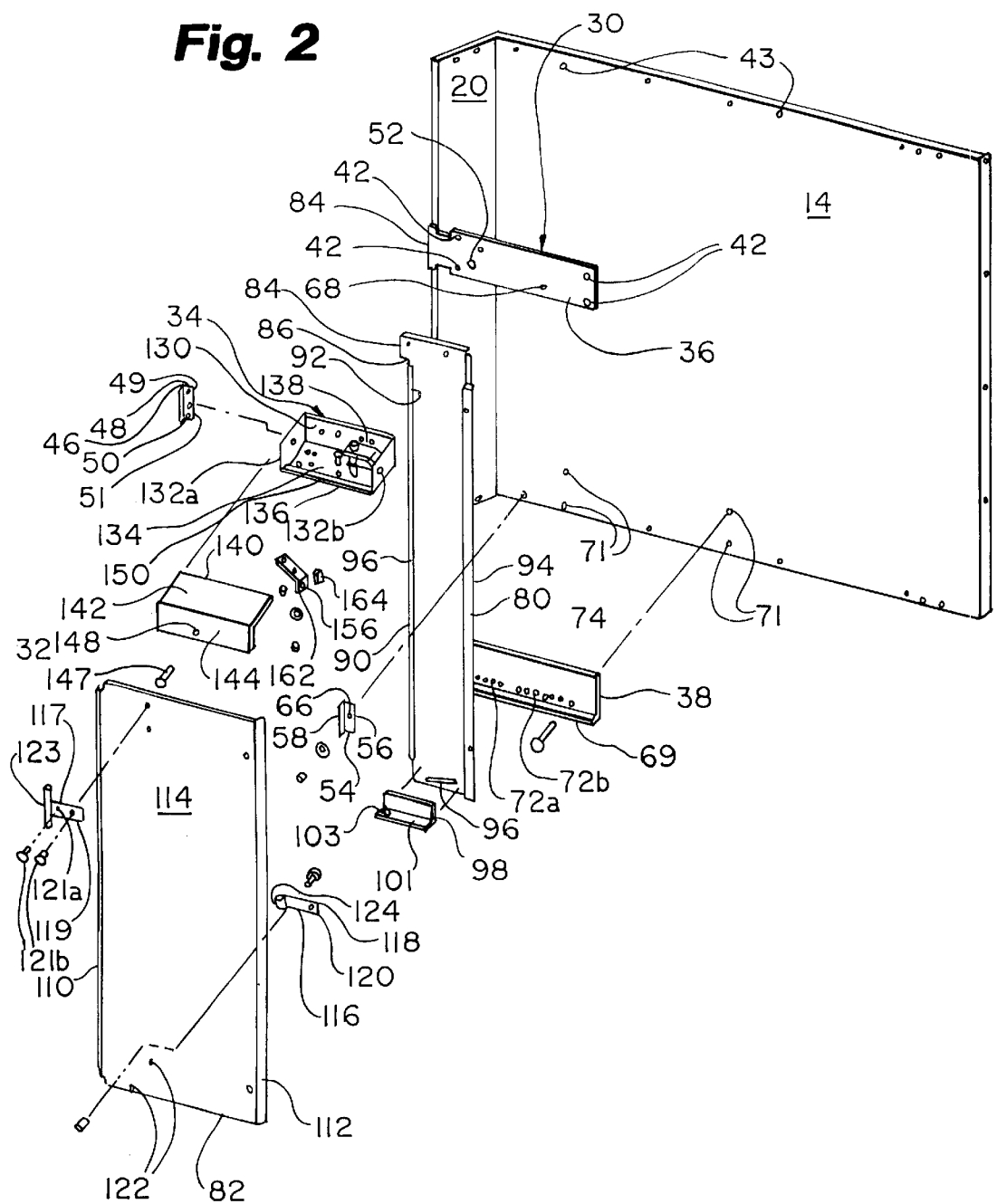
FIG. 2 is an exploded perspective view of the air mass flow measuring device.
Figure 3:
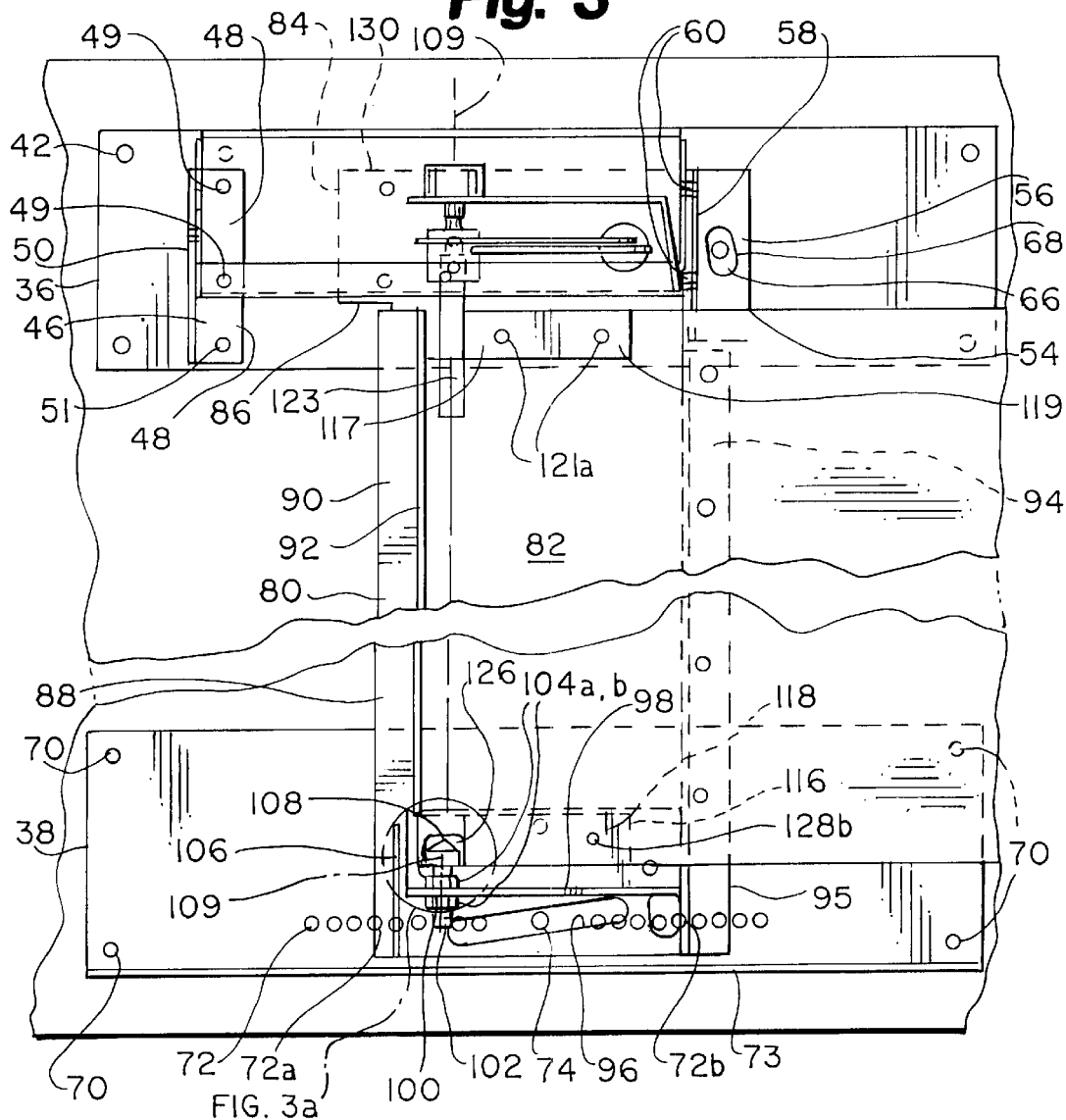
FIG. 3 is a side elevational view of the air mass flow measuring device.

The air mass flow measuring device 10 has three major components; vane support assembly 30, vane assembly 32, and sensing unit 34, as depicted in FIGS. 1–3.

The vane support assembly 30 is comprised of an upper bracket 36 and spaced apart lower bracket 38, as depicted in FIGS. 2 and 3. The upper bracket 36 is a generally planar metallic device. The upper bracket 36 has a bore 42 disposed proximate each of the four corners of the upper bracket 36. A suitable fastener such as a nut and bolt are disposed in each of the bores 42 to couple the upper bracket 36 to the backwall 14 of the outdoor air intake 12. Typically, bores 43 are defined in the backwall 14 that are in registry with the bores 42 for this purpose.

An L-shaped sensing unit support 46 has a first arm 48. The first arm 48 is coupled to the sensing unit 34 by fasteners disposed in bores 49. Second arm 50 is disposed generally transverse to the first arm 48. Second arm 50 typically has similar bores 49 defined therein to facilitate coupling of the sensing unit 34 to the sensing unit support 46 by means of suitable fasteners. A pivot bore 51 is defined in the lower portion of the first arm 48. The sensing unit support 46 is pivotally couplable to the upper bracket 36 by means of a suitable fastener, such as a nut and bolt, disposed in the pivot bore 51 and an upper bracket pivot bore 52 defined in the upper bracket 36 and in registry with the pivot bore 51. The pivotal connectability of the sensing unit support 46 and, consequently the vane assembly 32 and sensing unit 34, to the vane assembly support 30 is a key feature of being able to level the vane assembly 32, as will be described below. The sensing unit support 46 operates in cooperation with a level adjusting support 54.

The level adjusting support 54 was spaced apart from the sensing unit support 46. The level adjusting support 54 is similar in construction to the sensing unit support 46 in that the level adjusting support 54 is L-shaped having a first arm 56 and a second arm 58 disposed transverse to the first arm 56. A plurality of bores 60 are defined on the second arm 58 for coupling the sensing unit 34 to the level adjusting support 54 by means of suitable fasteners.

An elongate, angled slot 66 is defined in the first arm 56 of the level adjusting support 54. The angle of the elongate slot 66 is generally circumferential to the pivot bore 51. An upper bracket bore 68 is defined in the upper bracket 36. A suitable fastener extending through the elongate slot 66 and the upper bracket bore 68 may be used to fixedly couple the level adjusting support 54 and thus the sensing unit 34 to the upper bracket 36.

The lower bracket 38, also depicted in FIGS. 1 and 2, has a plurality of coupling bores 70 disposed proximate the four corners of the lower bracket 38. The coupling bores 70 are in registry with bores 71 defined in the backwall 14 of the outdoor air intake 12. Suitable fasteners 69 disposed in the bores 70, 71 are utilized for fixably coupling the lower bracket 38 to the backwall 14.

A central locking bore 74 is disposed between the two sets of mounting bores 70.

The second component of the air mass flow measuring device 10 is the vane assembly 32. The vane assembly 32 is best depicted in FIGS. 1–3. The vane assembly 32 has two major subcomponents; vertical support 80 and vane 82.

The vertical support 80 of the vane assembly 32 is generally an elongate-planar device having a relatively narrow width dimension that is couplable to the vane support assembly 30. The vertical support 80 is useful for supporting the vane 82, for preventing aerodynamic flutter of the vane 82 at high air mass flow volumes, and for leveling the vane assembly 32 within the outdoor air intake 12, as will be described.

The vertical support 80 has an upper leftward tending tab 84. The tab 84 is formed by a cut along the lower margin 86 of the tab 84. The left side margin 89 of the vertical support 80 that is beneath the cut forming the lower margin 86 of the tab 84 is bent backward through an arc that is somewhat greater than 90 degrees to form a rounded leading edge 90 of the vertical support 80. As depicted in FIG. 7, the rounded leading edge 90 defines a vane edge recess 92 that effectively shields the leading edge of the vane 82 from impingement of the air mass flow passing through outdoor air intake 12. The trailing edge of the vertical support 80 is bent through two successive substantially 90 degree bends (the second bend being generally the reverse of the first bend) to form a trailing edge flange 94. The outer margin 95 of the trailing edge flange 94 act as a stop against which the vane 82 bears during conditions of maximum air mass flow through the outdoor air intake 12, thus positioning the vane 82 substantially parallel with the intake backwall 14.

An elongate, angled slot 96 is defined proximate a lower margin of the vertical support 80. When the vertical support 80 is positioned proximate the vane support assembly 30, a locking bore 74 defined in the lower bracket 38 is in registry with the elongate slot 96.

An L-shaped hinge support bracket 98 is affixed to the vertical support 80 immediately above the elongate slot 96. The hinge support bracket is affixed to the vertical support 80 by means of suitable fasteners disposed in bores 99a formed in the hinge support bracket 98 and bores 99b (being in registry with bores 99a) formed in the vertical support 80.

Figure 3A:
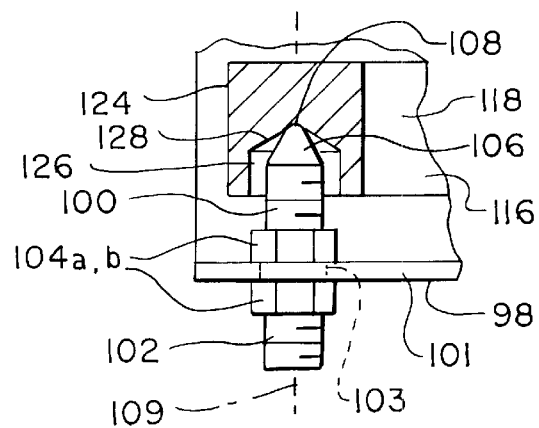
FIG. 3a is an enlarged side sectional view of the vane lower hinge in the circle 3a of FIG. 3.

Referring to FIGS. 2, 3, and 3a, a lower hinge member 100 is disposed in a bore 103 defined in a generally horizontal arm 101 of the hinge support bracket 98. The lower hinge member 100 is preferably formed of hardened steel and has a threaded shaft 102 that is positioned as desired with respect to the horizontal arm 101 by lock nuts 104a, 104b. The upper portion of the threaded shaft 102 is formed to define a conical hinge 106, terminating in hinge support point 108. A generally vertical vane pivot axis 109 is coincident with the longitudinal axis of the lower hinge member 100. As will be described further, the vane pivot axis 109 is spaced in front of the vane 82 (see FIG. 7 for an end-on view of the vane pivot axis 109) and is the pivot axis for the vane 82.

The second subcomponent of the vane assembly 32 is the vane 82 as depicted in FIGS. 1, 2, and 3. The vane 82 is generally formed of a planar metallic sheet that is preferably rectangular in shape. The width dimension of the vane 82 is preferably substantially greater than the width dimension of the vertical support 80. As best depicted in FIG. 7, the leading edge of the vane 82 is bent inward away from the airstream in intake 12 to define a curled leading edge 110. Similarly, the trailing edge of the vane 82 is bent inward away from the airstream in intake 12 to define a curled trailing edge 112. The generally flat plate 114 extends between the curled leading edge 110 and the curled trailing edge 112. The flat plate 114 bears substantially all of the force generated by the air mass flow in the intake 12 and affecting the air mass flow measuring device 10.

Figure 5:
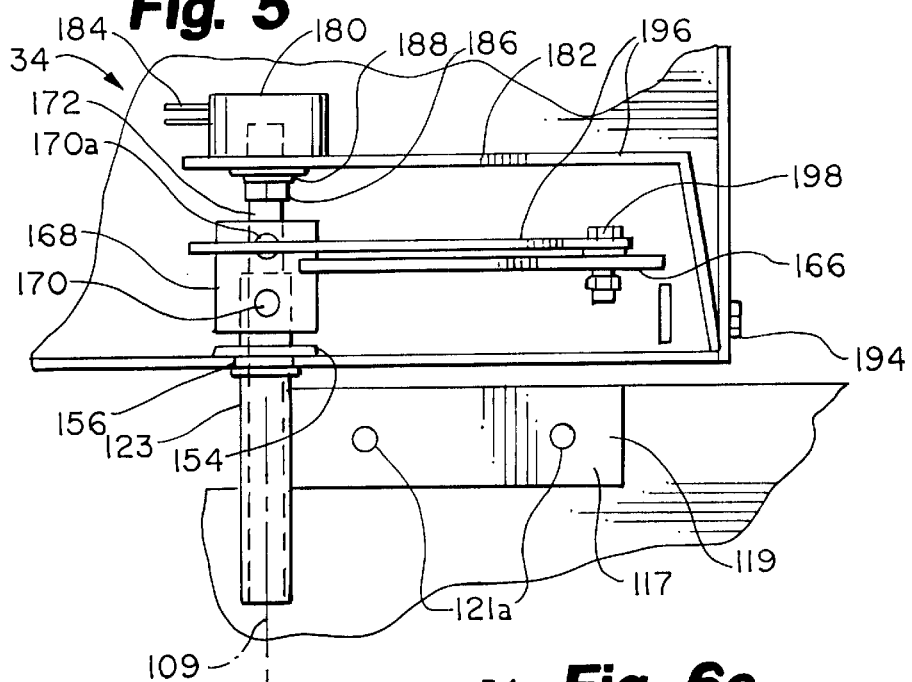
FIG. 5 is a side elevational view of the upper left portion of the vane assembly hinged to the sensing unit of the air mass flow measuring device.

As depicted in FIGS. 2, 3, and 5, an upper hinge 117 is disposed proximate the upper margin of the vane 82. The hinge 117 has a hinge plate 119 that is affixed to the flat plate 114 of the vane 82 by means of suitable fasteners disposed in bores 121a defined therein and bores 121b in registry therewith and defined in the flat plate 114. A generally vertical rod 123 has affixed to the plate 119 proximate the left margin thereof. When the upper hinge 117 is affixed to the vane 82, the upper margin of the rod 123 projects above the upper margin of the vane 82 for coupling to the sensor 180. The longitudinal axis of the rod 123 is concentric with the vane pivot axis 109.

A lower hinge 116 is affixed to the vane 82 proximate the lower left-hand margin thereof. The lower hinge 116 is preferably affixed to the rear leeward side of the flat plate 114 of the vane 82. The lower hinge 116 has a generally planar hinge plate 118 that is affixed the flat plate 114 by suitable fasteners disposed in bores 128a defined in the hinge plate 118 and bores 128b in registry therewith defined in the flat plate 114.

As best depicted in FIG. 3a, an inverted cup 124 is fixedly coupled to the hinge plate 118 at the left margin thereof. The cup 124 has a cup recess 126 defined therein. The cup recess 126 has a generally conical roof 128. Preferably, the conical roof 128 has shallower angle than the angle of the conical hinge 106 of the hinge member 100. Accordingly, when the cup 124 is disposed on the threaded shaft 102 of the hinge member 100, the hinge support point 108 rides only in the peak of the conical roof 128 in order to minimize rotational friction existing between the hinge member 100 and the lower hinge 116 by minimizing the contact area between the hinge member 100 and the lower hinge 116. Substantially all of the weight of the vane 82 is borne by the hinge support point 108.

The third major component of the air mass flow measuring device 10 is the sensing unit 34. The sensing unit 34 is depicted in FIGS. 2–5 and 6a–6c. Generally, the sensing unit 34 senses the angular deflection (rotation) of the vane 82 responsive to air mass flow through the outdoor air intake 12. Further, the sensing unit 34 plays a key role in leveling the vane assembly 32 within the outdoor air intake 12.

The sensing unit 34 has a housing 130 that is preferably formed of light plate metallic material. The housing 130 has opposed end walls 132a, 132b. The bottom 134 of the housing 130 includes an upward directed lip 136. A rear wall 138 extends between the end walls 132a, 132b and projects upward from the bottom 134, leaving the top and front portions of the housing 130 open. A cover 140 is utilized for closing the top and front portions of the housing 130.

The cover 140 has a top 142 and a generally transverse front wall 144. When the cover 140 is in place on the housing 130, the front wall 144 extends downward to overlap the lip 136. The cover 140 is affixed to the housing 130 by a suitable fastener 147 disposed in a bore 148 defined in the front wall 144 and a bore 150 in registry therewith defined in the lip 136.

A hinge bore 152 is defined in the bottom 134 of the housing 130. The hinge bore 152 is preferably disposed centrally in the bottom 134 toward the rear margin thereof. A minimum friction (preferably Teflon or nylon) bearing 154 is preferably disposed in the hinge bore 152. In assembly, the bearing 154 rotatably receives the upper portion of the rod 224 of the upper hinge 220, thereby keeping the vane 82 in substantially vertical alignment.

Figure 4:
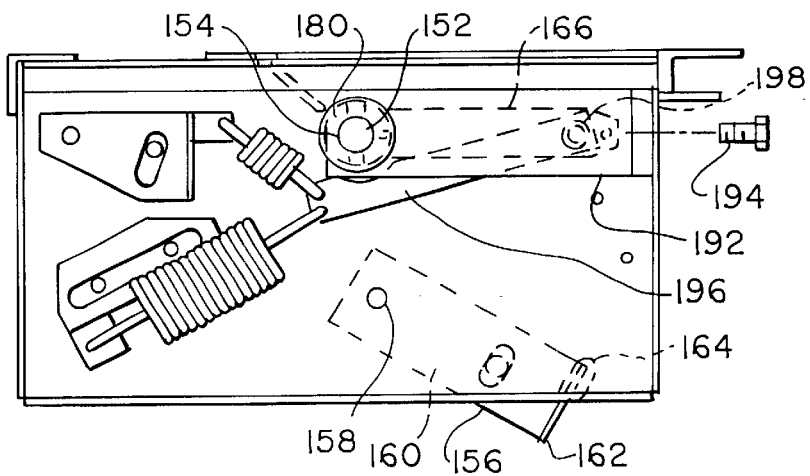
FIG. 4 is a top plan form view of a sensing unit of the air mass flow measuring device with the sensing unit cover removed.

As best depicted in FIGS. 2 and 4, a stop 156 is fixedly adjoined to the underside of the bottom 134 of the housing 130. The stop 156 is affixed to bottom 134 by suitable fasteners disposed in bores 158 defined in plate 160 of the stop 156 and bores 158b in registry therewith defined in the bottom 134. A downward directed stop flange 162 is disposed generally orthogonal to the plate 160. The stop flange 162 has a bumper 164 disposed on a edge margin thereof. As will be seen, the vane 82 rests against the bumper 164 under conditions of minimum air mass flow through the outdoor air intake 12.

An actuator arm assembly 166 is disposed within the housing 130 of the sensing unit 34. The actuator arm assembly 166 has a elongate arm 167 with a cup 168 disposed at an end margin of the arm 167. The cup 168 has a downwardly directed cup bore 169 defined therein. A threaded bore 170 extends through the wall of the cup 168 to intersect the bore 169. In assembly, the upper portion of the rod 224 of the upper hinge 220 is received within the bore 169 of the cup 168. The cup 168 and the rod 224 are fixedly joined together by a set screw threaded into the bore 170 to bear upon the rod 224. The potentiometer shaft acts as a hinge extension 172 that is coaxial with the longitudinal axis of the rod 224 is affixed to the top margin of the cup 168. The hinge extension 172 is rotatably received within a sensor 180.

The sensor 180 is mounted on a flexible metallic sensor mount 182. The sensor mount 182 is coupled at a distal end to the unit housing 130. The sensor 180 is fixedly joined to the sensor mount 182 at a proximal end thereof. The sensor mount 182 prevents rotation of the sensor 180 but is flexible enough to permit self-alignment of the sensor 180 with the vane 82 and permits the sensor 180 to float with respect to the vane 82 in order to minimize friction therebetween.

A depending hollow shaft 188 extends through a mount bore 190 defined in the sensor mount 182. A lock nut 192 threaded onto the hollow shaft 188 secures the sensor 188 to the sensor mount 182. It should be noted that the potentiometer shaft 189 extends downward through a bore defined in the hollow shaft 188. The potentiometer shaft 189 is free to rotate within the bore defined in the hollow shaft 188. A plurality of wires 184 are coupled to the sensor 180 for the transmission of signals therefrom.

A spring link 196 is pivotally coupled by a pivot connector 198 at a spring link 196 proximal end to the distal end of the actuator arm 167 of the actuator arm assembly 166. Such connection is best viewed in FIGS. 4, 5, and 6a–6c. The distal end of the spring link 196 is coupled to a pair of springs; the light spring 200 and the heavy spring 202. The light spring 200 and the heavy spring 202 are coupled at first ends thereof to the spring link 196 by curved spring ends thereof passing through respective bores defined in the distal end of the spring link 196.

The light spring 200 is connected at a second end to the light spring bracket 204. The light spring bracket 204 is pivotally connected to the bottom 134 of the housing 130 at pivot connection 206. A slot 208 is defined in the light spring bracket 204 spaced apart from the pivot connection 206. A threaded bore 209 defined in the bottom 134 is in registry with the slot 268. In assembly, the light spring bracket 204 may be rotated about the pivot connection 206 and affixed in the desired rotational disposition by a locking bolt threaded into the bore 209 and engaging the margins of the slot 208.

The heavy spring 202 is coupled at a second end to the heavy spring bracket 212. The heavy spring bracket 212 has an elongate slot 214 defined therein. A pair of threaded bores 216 are defined in the bottom 134. Each of the bores 216 is in registry with the slot 214. The heavy spring bracket 212 may be translated relative to the threaded bores 216 and locked in place as desired by locking bolts threaded into threaded bores 216 and engaging the side margins of the slot 214.

In operation, after installation of the outdoor air intake 12, preferably on the roof of a building serviced by an HVAC unit coupled to the outdoor air intake 12, the air mass flow measuring device 10 of the present invention is installed in the outdoor air intake 12. In order to receive accurate measurements of air mass flow through the outdoor air intake 12 (especially at the critical low air mass flow conditions), it is critical that the air mass flow measuring device 10 be leveled with respect to gravity within the outdoor air intake 12.

Figure 8:
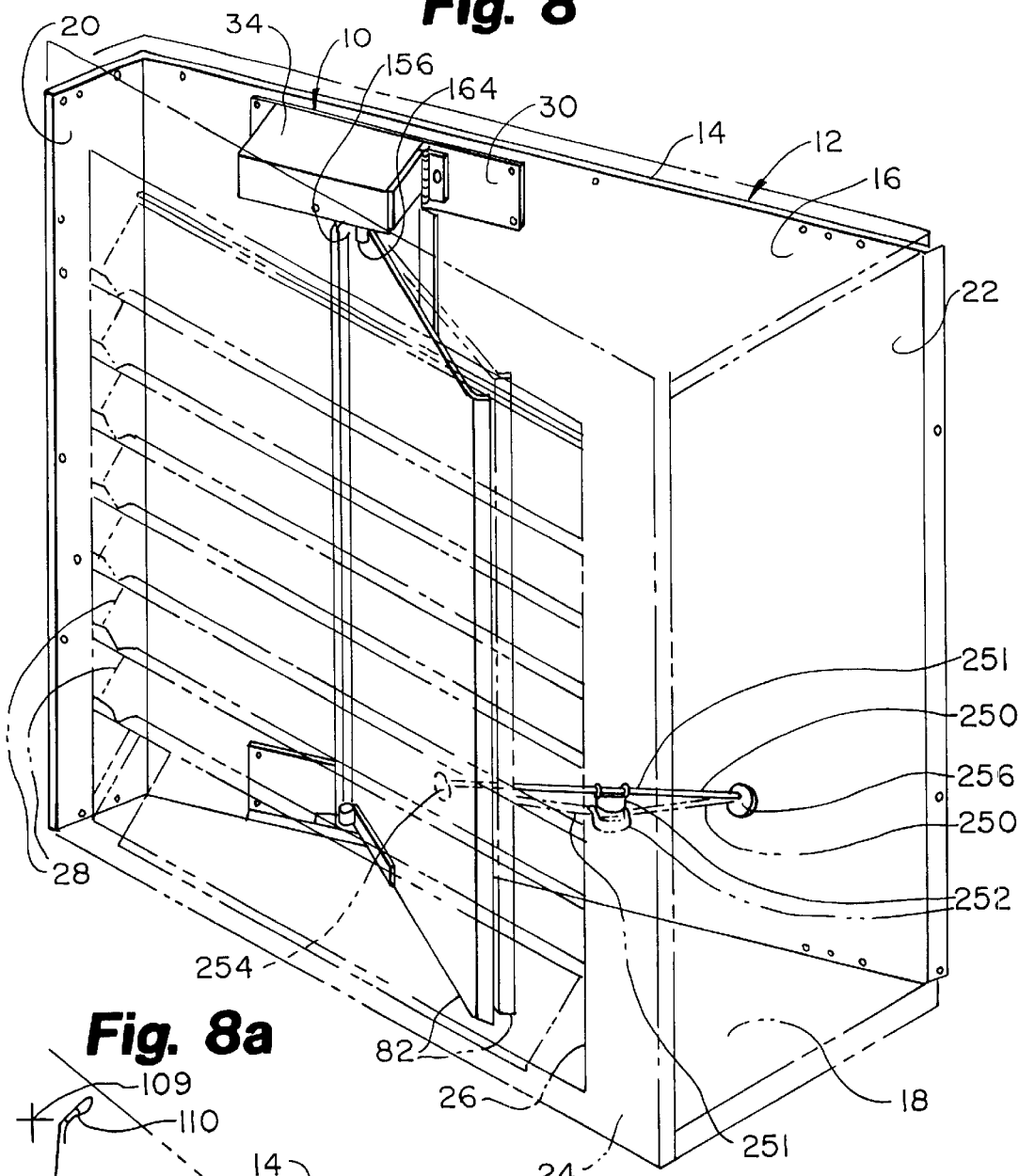
FIG. 8 is a perspective view of the air mass flow measuring device of the present invention installed in an exemplary inlet with the calibration jig in place.
Figure 8A:
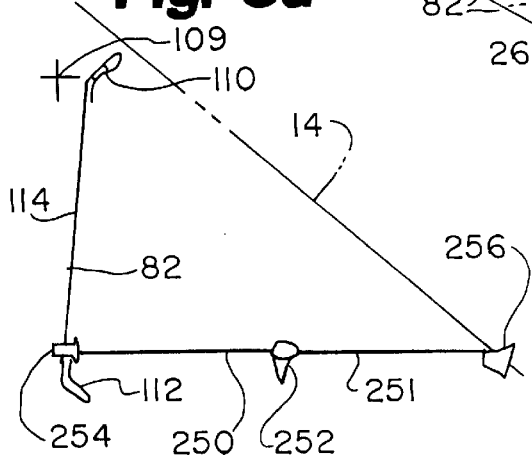
FIG. 8a is a top plan view of the air mass flow measuring device of FIG. 8.
Figure 8B:
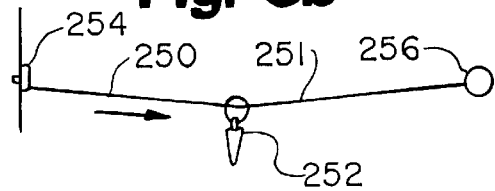
FIG. 8b is a side elevational view of the calibration jig of the air mass flow measuring device viewed from the right as depicted in FIG. 8.

A method and calibration jig 250 have been devised in order to repeatably level the air mass flow measure device 10 within the outdoor air intake 12 in the field without the use of extensive calibration and instrumentation equipment. Referring to FIGS. 8, 8a, and 8b, a slender wire 251 of known length is extended substantially horizontally between a bore 254 disposed proximate the curled trailing edge 112 of the vane 82 and a bore 256 defined in the backwall 14 of the outdoor air intake 12. A weight 252 of known mass is suspended from the wire 251 at the center of the wire 251. With no air mass flow through the outdoor air intake, the weight 252 will pull the vane 82 off the bumper 164 of the stop 156, as depicted in the rotational translation from the solid lined disposition (against the bumper 164) of the vane 82 to the phantom disposition of the vane 82 in FIG. 8. It is known that the calibrated weight 252 will pull the vane 82 off the bumper 164 a known distance when the vane assembly 32 is in a level condition with respect to gravity. At this known distance, there is a known output of the sensor 180.

During installation and leveling of the air mass flow measuring device 10 within the outdoor air intake 12, the output of the sensor 180 is monitored. The vane assembly 32 and sensing unit 34 of the air mass flow measuring device 10 are free to pivot about a fastener disposed in the pivot bore 51 of the sensing unit support 46 and further disposed in the upper bracket pivot bore 52 in registry therewith. Leveling is effected by inserting a slender instrument, such as a screwdriver, through the pry slot 97 of the vertical support 80 and into one of the pry bores 72b. By working the instrument against the margin of the pry slot 97, the air mass flow measuring device 10 may be rotated in very small controllable increments about the pivot bore 51 to effect leveling of the air mass flow measuring device 10. At this point, the output of the sensor 180 is monitored such that when an output of the sensor 180 that is equal to the known output at which the air mass flow measuring device 10 is level with respect to gravity, a bolt is threaded into the locking bore 74. The bolt engages the side margins of the elongate slot 96 to lock the air mass flow measuring device in a level condition. Once leveled, the wire 250 and depending weight 252 of the calibration jig 250 are removed from the air mass flow measuring device 10.

Figure 6A:
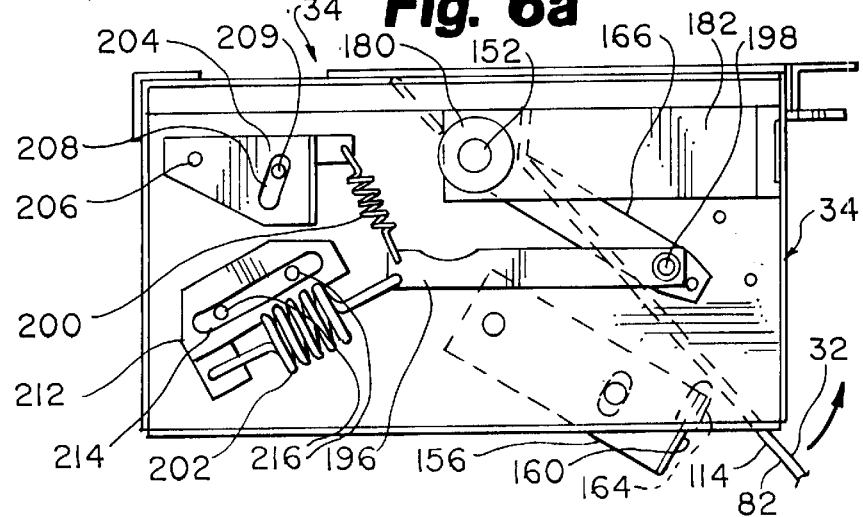
Figure 9:
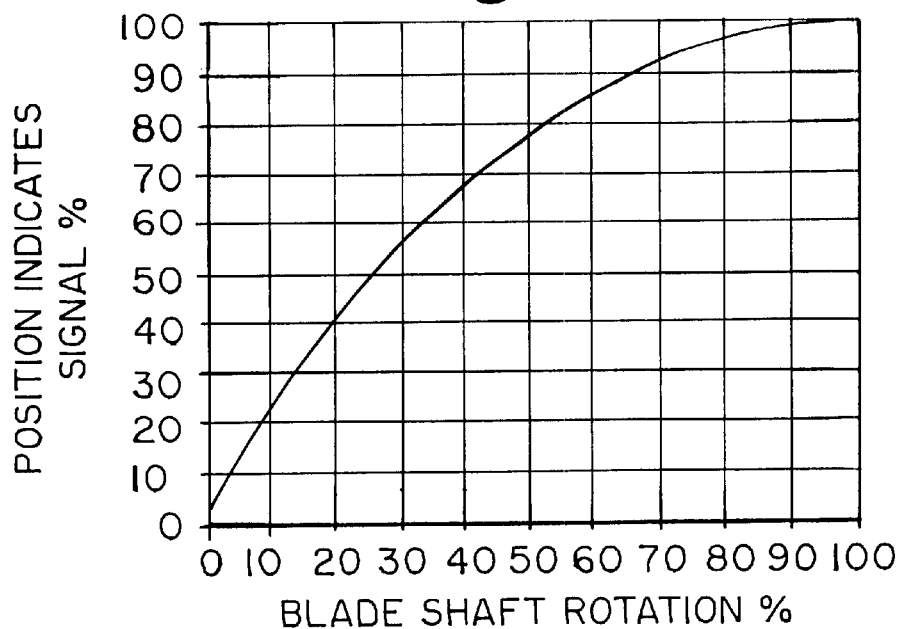
FIG. 9 is a graphic representation of the position indication signal as a percent in relation to the blade shaft rotation as a percent.

After the one-time leveling calibration of the air mass flow measuring device 10 in the outdoor air intake 12, the air mass flow measuring device 10 is ready for operation. A graphic representation of the position indication signal as a percent in relation to the blade shaft rotation as a percent is depicted in FIG. 9. Operation may be understood by reference to FIGS. 6a–6c. The minimum air mass flow condition is depicted in FIG. 6a. In this condition, the light spring 200 is exerting a force through the spring link 196 and the actuator arm 167 on the vane 82 of the vane assembly 32. Air mass flow counters the force of the light spring 200 and of gravity and moves the vane 82 away from the stop 164. At this point, the heavy spring 202 is generally slack, exerting only enough force on the spring link 196 to hold it to the position as depicted in FIG. 6a.

As air mass flow increases, the air exerts an increasing force on the flat plate 114 of the vane 82. And the vane 82 rotates from the minimum air disposition depicted in FIG. 6a to the mid-point (about 50% of vane rotation) of air mass flow as depicted in FIG. 6b. In this condition, the force of the air mass flow acting on the flat plate 114 is balanced by the light spring 200 at full extension and the heavy spring 202 under partial tension. At this point, the hinge extension 172 has rotated within the sensor 180 and the sensor 180 is providing an output that is related to the air volume flow at the mid-point.

The vane 82 position is depicted at the condition of maximum air mass flow in FIG. 6c. In FIG. 6c, the vane 82 is substantially parallel with the back wall 14 of the outdoor air intake 12. Rotation of the vane 82 is arrested by coming into contact with the outer margin 95 of the trailing edge 94 of the vertical support 80. In this condition, the tension in the light spring 200 has been reduced to near zero. The tension in the heavy spring 202 is at its maximum. The sensor 180 is at this disposition providing a single output that is related to the maximum air mass flow through the outdoor air intake 12.

Referring to FIG. 7, it is noted that the curled leading edge 110 of the vane 82 resides in the vane edge recess 92 defined by the rounded leading edge 90 of the vertical support 80 at all angular dispositions of the vane 82 between the minimum air mass flow disposition to the maximum air mass flow disposition. Such disposition of the curled leading edge 110 is beneficial in shielding the vane 82 from the aerodynamically disturbing effects of the air volume passing down both sides of the flat plate 114. Such condition, which would be most prevalent at the maximum air mass flow, would cause fluttering of the vane 82 absent the protection afforded by the vane edge recess 92 defined by the rounded leading edge 90 of the vertical support 80.

Figure 10A:
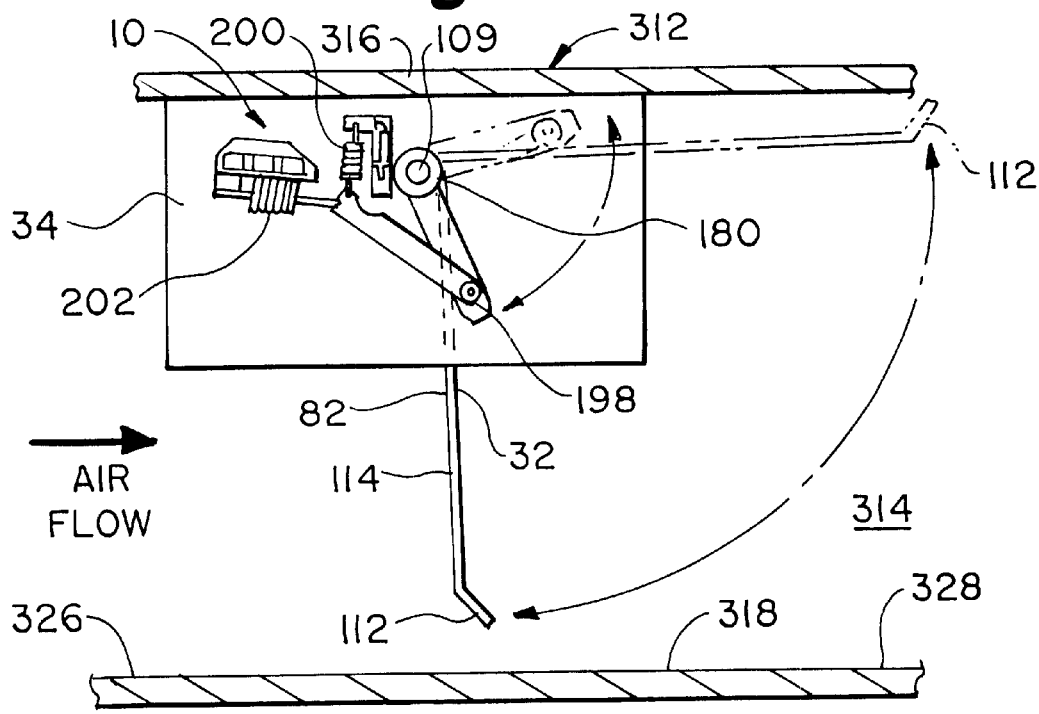
FIG. 10a is a side sectional view of an embodiment of the present invention depending from the upper wall of a rectangular duct, the vane axis of rotation being generally horizontal.
Figure 10B:
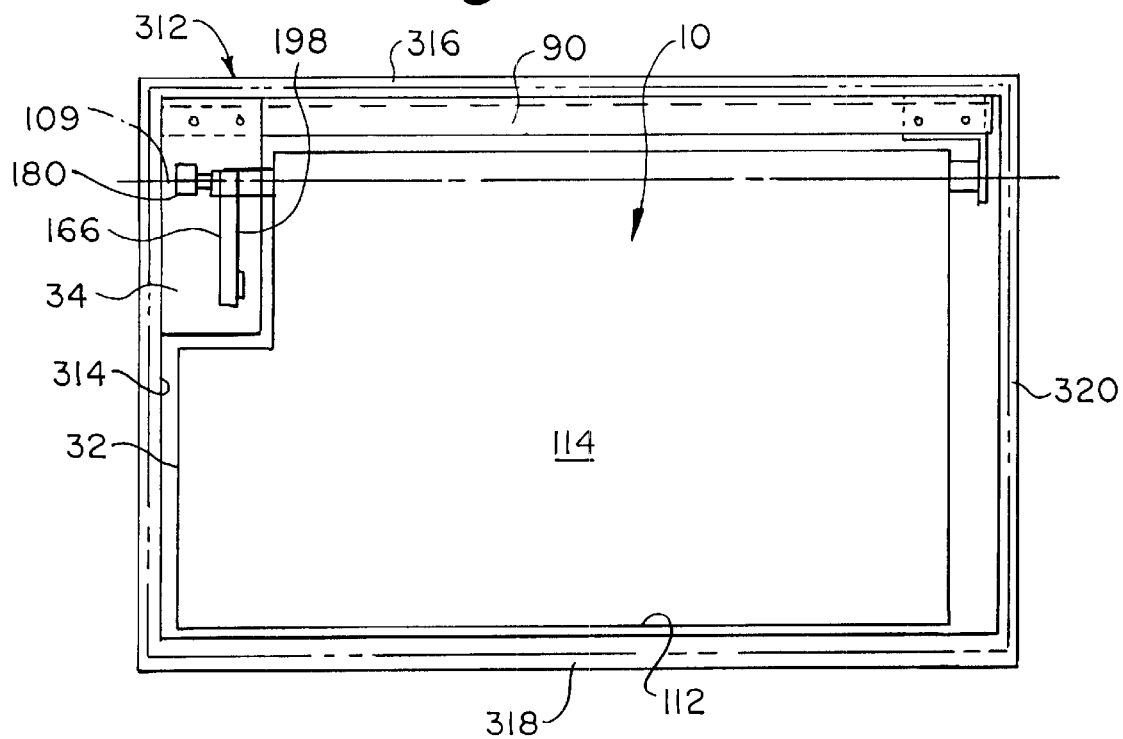

An exemplary air duct is depicted at 312 in FIGS. 10a and 10b. The air duct 312 is generally rectangular in cross-section and has a generally planar backwall 314 and a top 316 and opposed bottom 318. A sidewall 320 is disposed opposite the planar backwall 314. A front inlet opening 326 is defined at the left of the intake 312 as depicted in FIG. 10a. A rear discharge opening 328 is defined at the right of the intake 312 as depicted in FIG. 10a. Ambient air typically flows into the front inlet opening 326, past the air mass flow measuring device 10, and exits the air intake 312 through the rear discharge opening 328. The rear discharge opening 328 is typically ducted to the HVAC system for the delivery of an air mass flow thereto.

The air mass flow measuring device 10 is disposed in the duct 312 and depends from the top 316. The air mass flow measuring device 10 has major components; vane assembly 32 and sensing unit 34, substantially in accord with the description above. Significantly, the vane pivot axis 109 is substantially horizontal and is disposed proximate the top 316 of the duct 312. The solid disposition of the air mass flow measuring device 10 as depicted in FIGS. 10a, 10b is the minimum air mass flow disposition. In this disposition, gravity plays a significant role in biasing the vane 82 of the vane assembly 32 in the depending disposition.

As the air mass flow increases, the vane 82 rotates upward until the maximum air mass flow disposition is attained as depicted in phantom in FIG. 10a. The biasing afforded by the springs 200, 202 of the sensing unit 34 is substantially as described above. An output signal from the sensor 180 of the sensing unit 34 that is related to air mass flow in the duct 312 is substantially as described above with respect to the more vertically oriented air mass flow measuring device 10 of FIGS. 1–8 and as depicted in FIG. 9.

A second preferred embodiment of the air flow measuring device 10 of the present invention is depicted in FIGS. 11–18b. In these figures, like numerals throughout denote like components as described above with reference to the embodiment of FIGS. 1–9.

The air flow measuring device 10 includes a vane support assembly 30 and a vane assembly 32 that are much the same as described with reference to the previous embodiment. The sensing unit 34 and the calibration jig 35 are substantially changed with reference to the previously described embodiment. Like the previously described embodiment, the air flow measuring device 10 of FIGS. 11–18a is designed to be installed in a side opening outdoor air intake 12.

Figure 11:
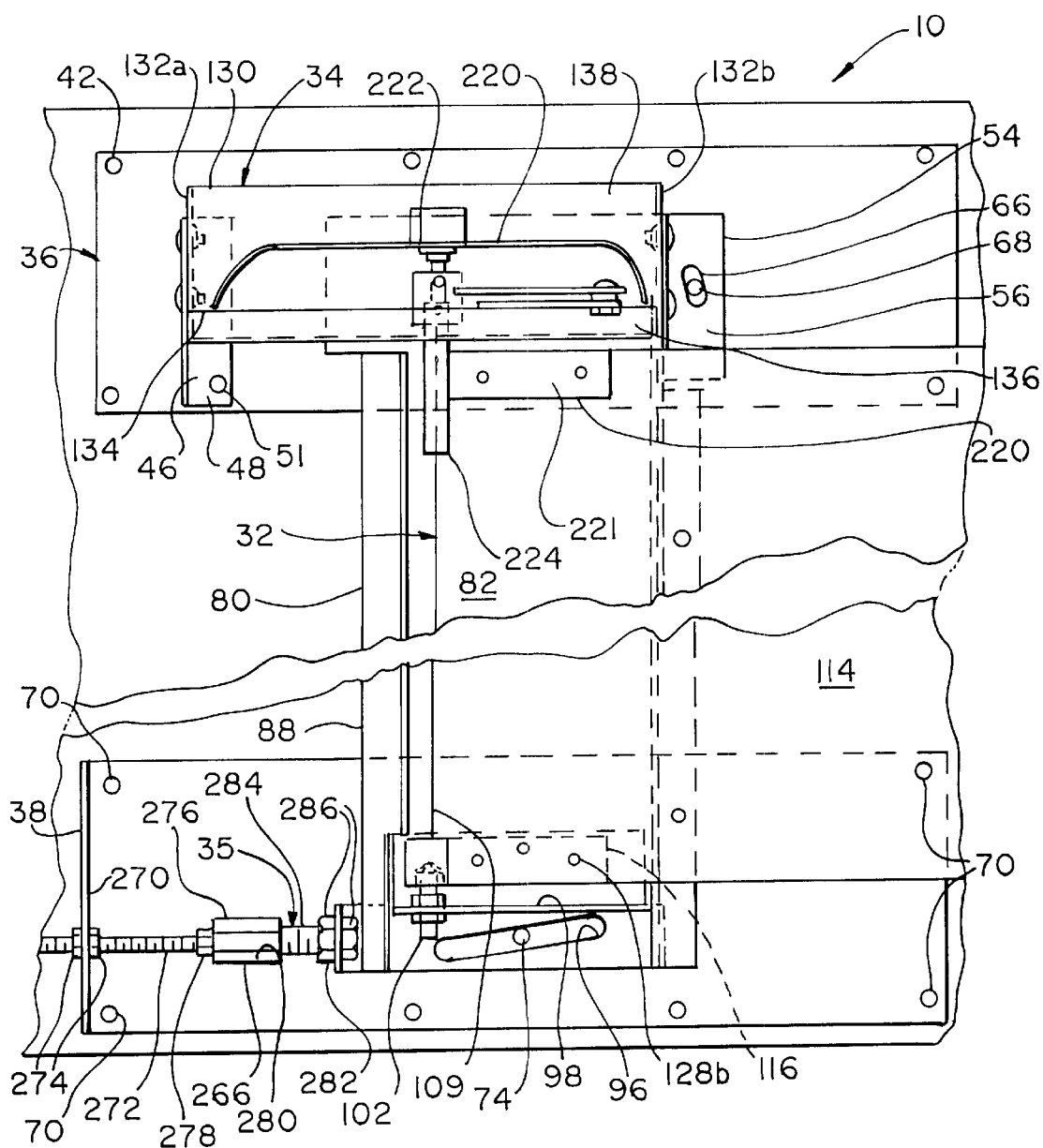
FIG. 11 is a front perspective, fragmentary view of an alternative embodiment of the air flow measuring device of the present invention.

Referring now to FIG. 11, it should be noted that the light spring 200 and heavy spring 202 of the sensing unit 34 are deleted from the representation for clarity. The second embodiment of sensing unit 34 is depicted affixed to the upper margin of the vane assembly 32. The leveling vernier 266 of the calibrating jig 35 is depicted affixed to the lower margin of the vane assembly 32.

Referring to FIGS. 12–15c, the sensing unit 34 includes the sensor 180 mounted on a flexible arch support 220. The sensor 180 is mounted in a sensor bore 222 defined in the flexible arch support 220. The flexible arch support 220 is anchored at a first end to a fixed mount 224 by screws 226. The fixed mount 224 is fixed in position relative to the housing 130 of the sensing unit 34.

The second end of the flexible arch support 220 is affixed to an adjustable mount 228 by screws 226. The adjustable mount 228 is pivotable about the axis A (FIG. 12) by hinge 230. The adjustable mount 228 includes an adjustment tab 232 that is disposed generally parallel to the bottom 134 of the housing 130. The adjustment tab 232 is selectively coupled to the plate 236 by a bolt 234. The plate 236 is preferably affixed to the bottom 134. The distal end of the bolt 234 projects through a bore (not shown) defined in the adjustment tab 232. Lock nuts 238 affix the adjustment tab 232 with respect to the plate 236. Threading the lock nuts 238 up and down on the bolt 234 acts to cause rotation about the axis A and to cause concurrent flexure of the flexible arch support 220.

Figure 12:
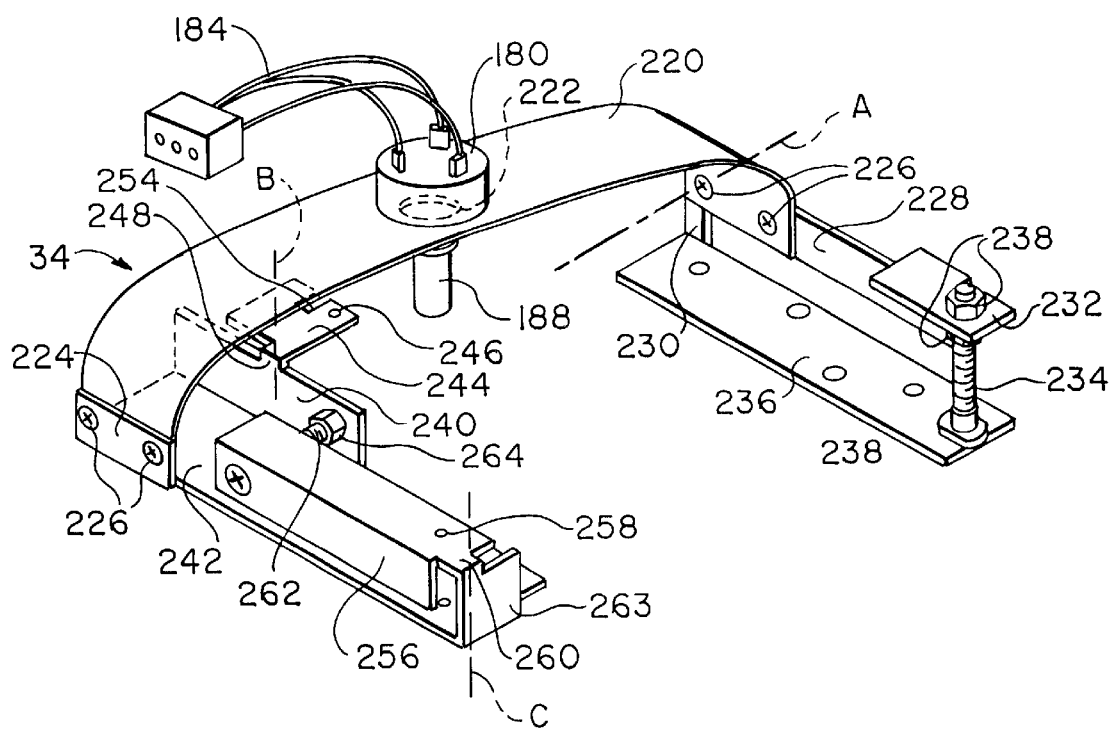
FIG. 12 is a perspective view of the sensing unit of the air flow measuring device of FIG. 11.

A fixed spring mount 240 is coupled to the plate 242. The fixed spring mount 240 is generally upwardly directed and orthogonally disposed with respect to the plate 242. A small spring mount 244 is disposed generally parallel to the plate 242 extending rightward from the fixed spring mount 240 as depicted in FIG. 12. The small spring mount 244 has a mount bore 246 defined therein. A slender metal strap comprising a hinge 248 couples the small spring mount 244 to the fixed spring mount 240. A bend slot 254 is defined in the inward directed margin of the small spring mount 244. The small spring mount 244 is designed to be rotated in a generally horizontal plane about the axis B (FIG. 12) by bending the hinge 248, to permanently position the small spring mount 244 as desired for proper calibration of the air flow measuring device 10. Such calibration is described in more detail below.

A large spring mount 256 generally overlies the plate 242. The large spring mount 256 has a mount bore 258 defined therein. The large spring mount 256 is coupled to the hinge mount 263 by a hinge 260. The hinge mount 263 is upwardly directed from the plate 242. The hinge 260 is comprised of a slender, bendable metal strap.

A bolt 262 couples the distal end of the large spring mount 256 to the fixed spring mount 240. Lock nuts 264 are in threaded engagement with the threads defined on the bolt 262. Rotating the lock nuts 264 on the bolt 262 acts to rotate the large spring mount 256 in a generally horizontal plane about the axis C (FIG. 12). Such rotation is accomplished by bending the hinge 260 to permanently position the large spring mount 256 as desired for calibration.

Figure 12A:
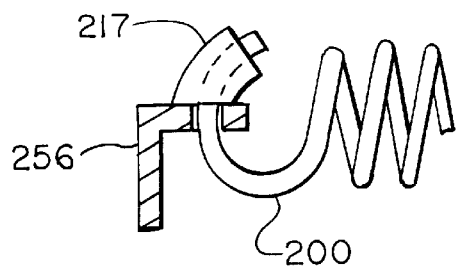
FIG. 12a is a side elevational view of a spring coupling.

There is a need to ensure that from cycle to cycle of the vane 82 the springs 200, 202 always are under the same tension at any given position of the vane 82. This ensures that the air flow measuring device 10 maintains calibration from cycle to cycle. Referring to FIG. 12a, there is a depiction of the coupling of the large spring 202 to the large spring mount 256. It is to be understood that a similar coupling may be utilized for coupling the small spring 200 to the small spring mount 242 and that such a coupling is used at both ends of both of the springs 200, 202. In order that the same point on the curved end of the spring 200, 202 is always in engagement with the mount 244, 256, a small sleeve 217 is placed on the curved end of the spring 200, 202. The sleeve 217 is preferably made of a resilient material and may include, for example, a small piece of rubber tubing, or a heat shrinkable tube. The sleeve 217 is forced into a compressive engagement with the mount bore 246, 258. In this manner, when the respective spring 200, 202 cycles from a slack condition to a condition under tension, the tension at any given point is always the same from cycle to cycle since the point of engagement of the spring 200, 202 with the mount 244, 256 and with the spring link 196 is always at the same point.

Figure 16:
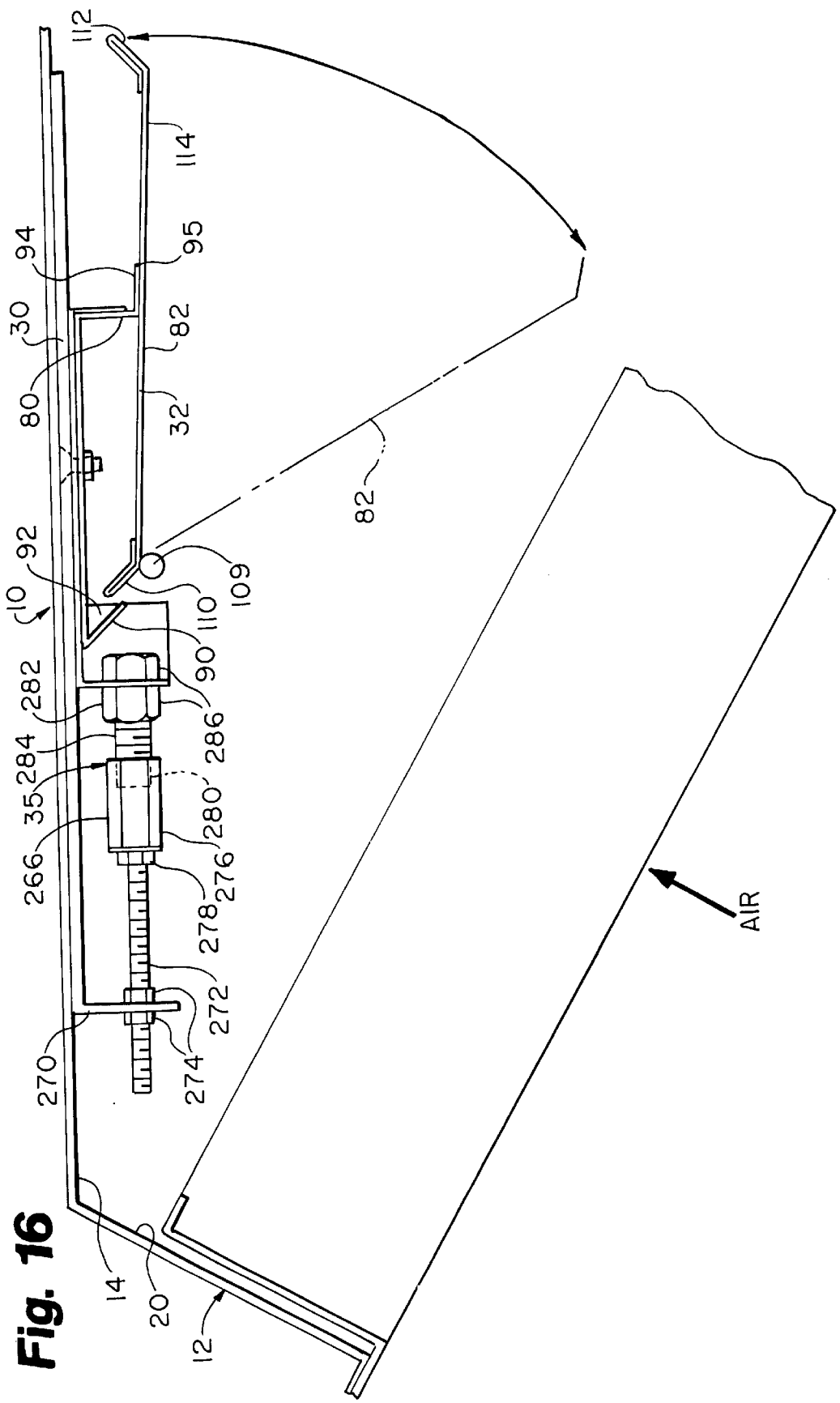
FIG. 16 is a top plan form view of the vane assembly of the embodiment of FIG. 11 disposed relative to the vane support assembly.
Figure 17:
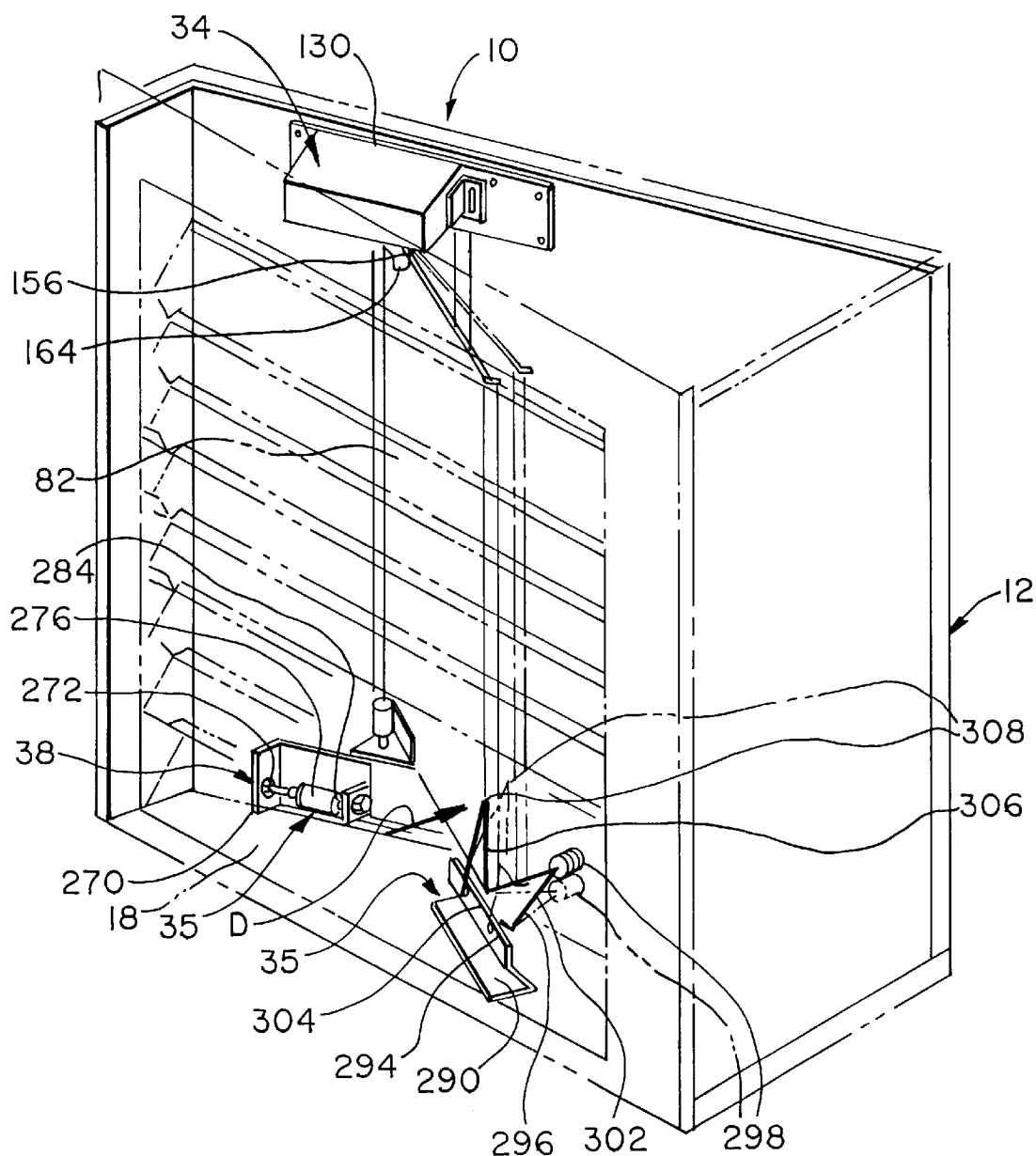
FIG. 17 is a perspective view of the air mass flow measuring device of FIG. 11 installed in an exemplary inlet with an alternative embodiment of the calibration jig in place.

The calibration jig 35 of the air flow measuring device 10 is depicted in FIGS. 16–18a. The calibration jig 35 has two major components: leveling vernier 266 and calibrated weight assembly 268. The leveling vernier 266 is depicted in FIGS. 11, 16, and 17. The leveling vernier 266 is supported by a mount 270 that is coupled to the vane support assembly 30. As previously indicated, the vane support assembly 30 is fixedly coupled to the outdoor air intake 12. A threaded rod 272 is disposed in a bore (not shown) defined in the mount 270. The threaded rod 272 is fixed in position proximate a distal end of the threaded rod 272 by a pair of lock nuts 274. The proximal end of the threaded rod 272 is threadedly engaged with a nut 278 affixed to a first end of the turnbuckle 276. The turnbuckle 276 has a threaded bore 280 defined therein. The threaded shaft 284 of a base 282 is threadedly engaged with the threaded bore 280. The base 282 is fixedly coupled to the vane support assembly 30 by means of lock nuts 286.

While the leveling vernier 266 appears like a standard turnbuckle, it is in fact much different. A standard turnbuckle has left handed threads on one side and right handed threads on the other side such that the rotation of the turnbuckle acts to simultaneously extend (or retract) both of the two rods coupled to the two ends of the turnbuckle. In distinction, both the threaded rod 272 and the threaded shaft 284 of the leveling vernier 266 have right handed threads (both being left handed threads would work as well). While the threads in a standard turnbuckle are typically the same size, but different direction, the threads on the threaded shaft 284 are of different size than the threads on a threaded rod 272, but the same direction. In a preferred embodiment, the exemplary threads on the threaded rod 272 are size ¼-20NC and the threads on the threaded shaft 284 are size ½-13NC. Accordingly, a single rotation through 360 degrees of the turnbuckle 276 results in either lengthening or shortening (depending on the direction of turnbuckle 276 rotation) the leveling vernier 266 by an amount equal to 1/13 inch–1/20 inch. The expedient of having both the threaded rod 272 and the threaded shaft 284 with threads in the same direction and different sized threads results in being able to change the length of the leveling vernier 266 by very fine amounts in order to very accurately level the vane assembly 32 of the air flow measuring device 10. The amount of change of length of the leveling vernier 266 per revolution of the turnbuckle 276 is 0.076 inch–0.05 inch for a total of 0.026 inch per revolution for the exemplary threads. Finer threads would result in even finer adjustment as long as the threads were different size and of the same direction.

Figure 18A:
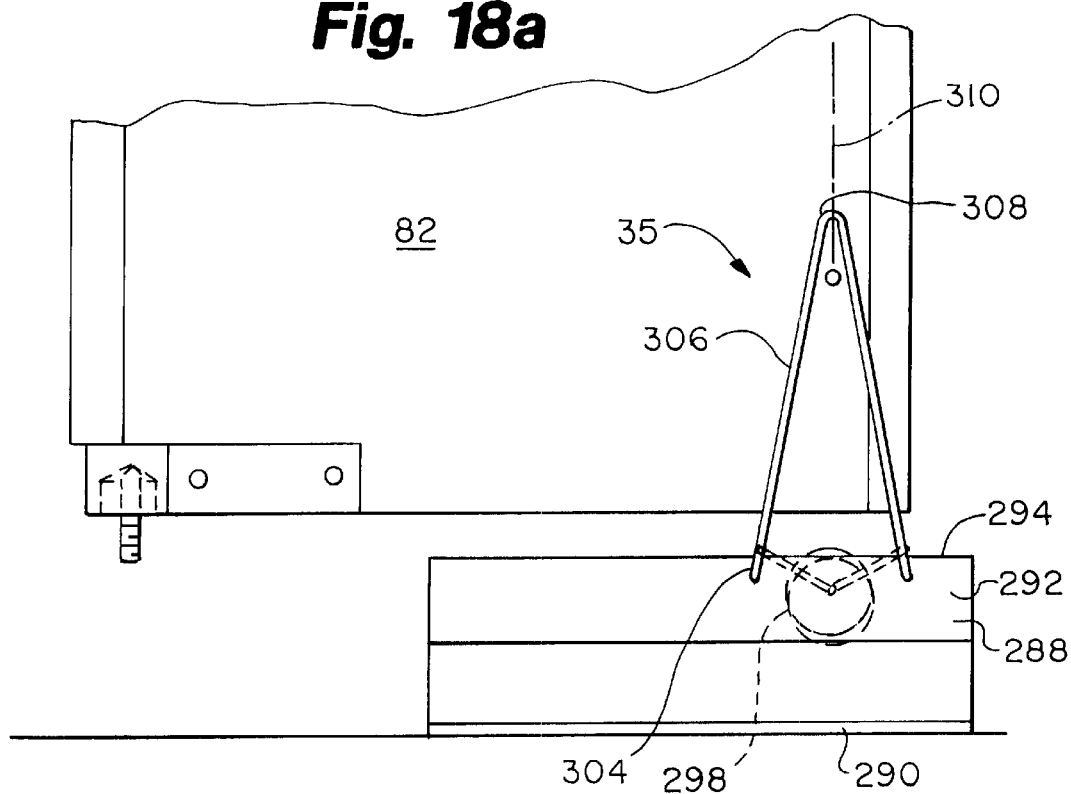
FIG. 18a is a front elevational view of the air mass measuring device of FIG. 17.
Figure 18B:
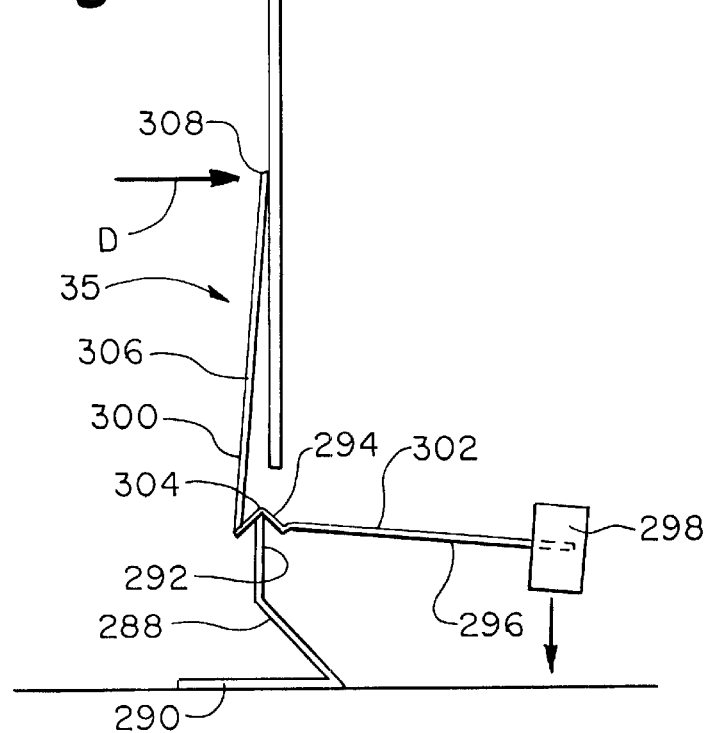
FIG. 18b is a side elevational view of the vane of FIG. 18a with the alternative embodiment of the calibration jig in place.

The calibrated weight assembly 268 of the calibration jig 35 is depicted in FIGS. 17–18b. The calibrated weight assembly 268 has two components: fulcrum 288 and balancing weight 296. Fulcrum 288 has a base 290 that is affixed to the bottom 18 of the outdoor air intake 12. The fulcrum 288 is only temporarily disposed within the outdoor air intake 12 and accordingly, the fulcrum 288 may be affixed to the bottom 18 by means of duct tape or other easily removable means. The fulcrum 288 includes a generally upwardly directed blade 292 that is affixed to the base 290. The blade 292 presents a upper blade margin 294 for supporting the balancing weight 296.

The balancing weight 296 includes a selected mass 298. The mass 298 is fixedly coupled to the support 300. The support 300 acts as a lever to impose a known force on the vane 82. The support 300 has a first arm 302. The mass 298 is affixed to the first arm 302 proximate the distal end thereof. A crook 304 is formed in the support 300 proximate the proximal end of the first arm 302.

A second arm 306 is connected at a proximal end thereof to the crook 304. The second arm 306 has a distal end 308. Preferably, the second arm 306 is orthogonally disposed in relationship to the first arm 302. When the balancing weight 296 is positioned on the fulcrum 288, the blade margin 294 rides in the apex of the crook 304.

Figure 15C:
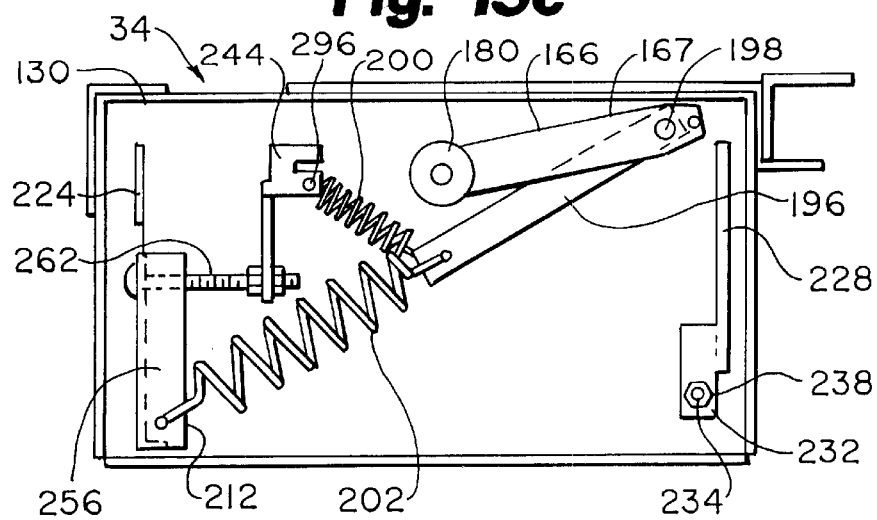
FIGS. 15a–15c are top plan form views of the sensing unit of the embodiment of FIG. 11 commencing at the minimum air mass flow disposition in FIG. 15a and progressing to the maximum air mass flow disposition in FIG. 15c.
Figure 15B:
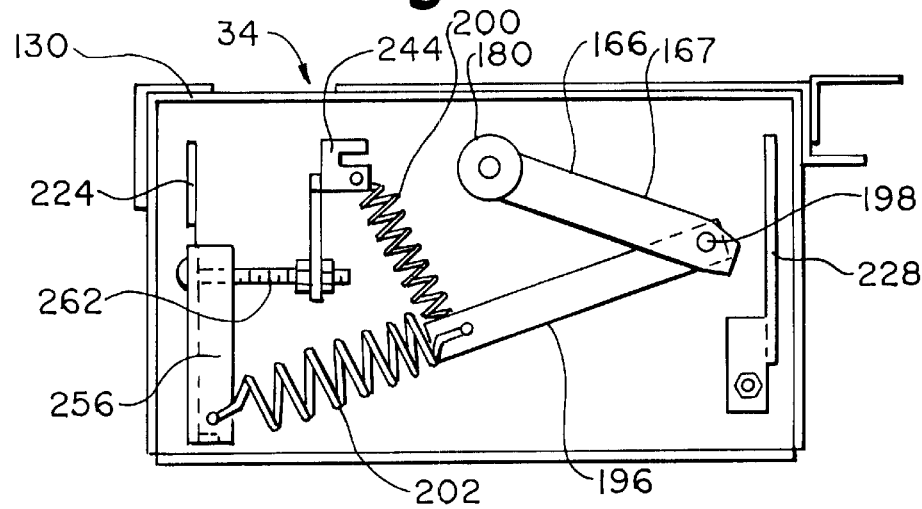
Figure 15A:
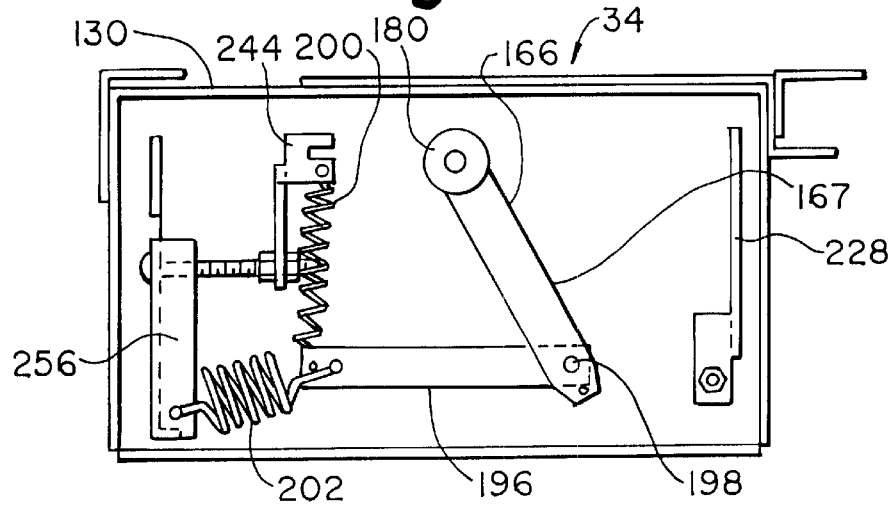

In order to calibrate the air flow measuring device 10 at the factory, the vane assembly 32 is first leveled. This is preferably accomplished by adjusting the bottom vane pivot such that the vane 82 of the vane assembly 32 is vertical as indicated by a level held on the vane 82 when the vane is in the maximum air position as indicated in FIG. 15c. Before installing the springs 200, 202, the actuator arm 167 of the sensing unit 34 must be accurately affixed to the vane 82 of the vane assembly 32. This is done by referencing both the actuator arm 167 and the vane 82 to the housing 130. In practice, precision bores 290, 294 are defined in the bottom 134 of the housing 130. The vane 82 is rotated such that pins dropped through the bores 290 lie on either side of the vane 82, thereby accurately positioning the vane 82 with respect to the bottom 134 of the housing 130. A further pin is dropped through the bore 292 defined proximate the distal end of the actuator arm 167 and thence through the bore 294. This accurately positions the actuator arm 167 with respect to the bottom 134 of the housing 130. With both the actuator arm 167 and the vane 82 held affixed with respect to the bottom 134 of the housing 130, the actuator arm 167 is fixedly coupled to the vane 82 by means of the set screw 170.

The next step is to accurately affix the sensor 180 to the actuator arm 167. This is accomplished with both the actuator arm 167 and the vane 82 pinned as described in the previous step. Sensor shaft 172 is slipped into the actuator arm 167 by positioning the hollow shaft 188 over the upward directed bore 171. In this disposition, the sensor shaft 172 is free to rotate relative to the actuator arm 167. Using a precision power supply and a volt meter connected to the sensor shaft 172 via the wire 184, the sensor shaft 172 is rotated relative to the hollow shaft 188 to obtain a known sensor volt reading. When the known volt reading is achieved, the sensor 180 is correctly positioned for the pinned positions of both the actuator arm 67 and the vane 82. The sensor shaft 172 is then fixedly coupled to the actuator arm 167 by the set screw 170a.

The next step in the calibration procedure is to level the vane 82 using the leveling vernier 266 of the calibration jig 35. The vane 82 and the actuator arm 167 are unpinned at this point and the vane 82 is positioned at a point at which a second known voltage reading is obtained from the sensor 180. At this point, the turnbuckle 276 of the leveling vernier 266 is rotated such that the vane 82 is leveled. A level indication occurs when the vane 82 is slightly disturbed as by wrapping the vane 82 with a finger and the vane 82 remains precisely where it was to obtain the second known voltage reading. At this point the vane 82 is balanced and gravity does not cause the vane 82 to swing when wrapped with the finger. Such swinging would be indicated by a changing voltage reading.

Figure 13:
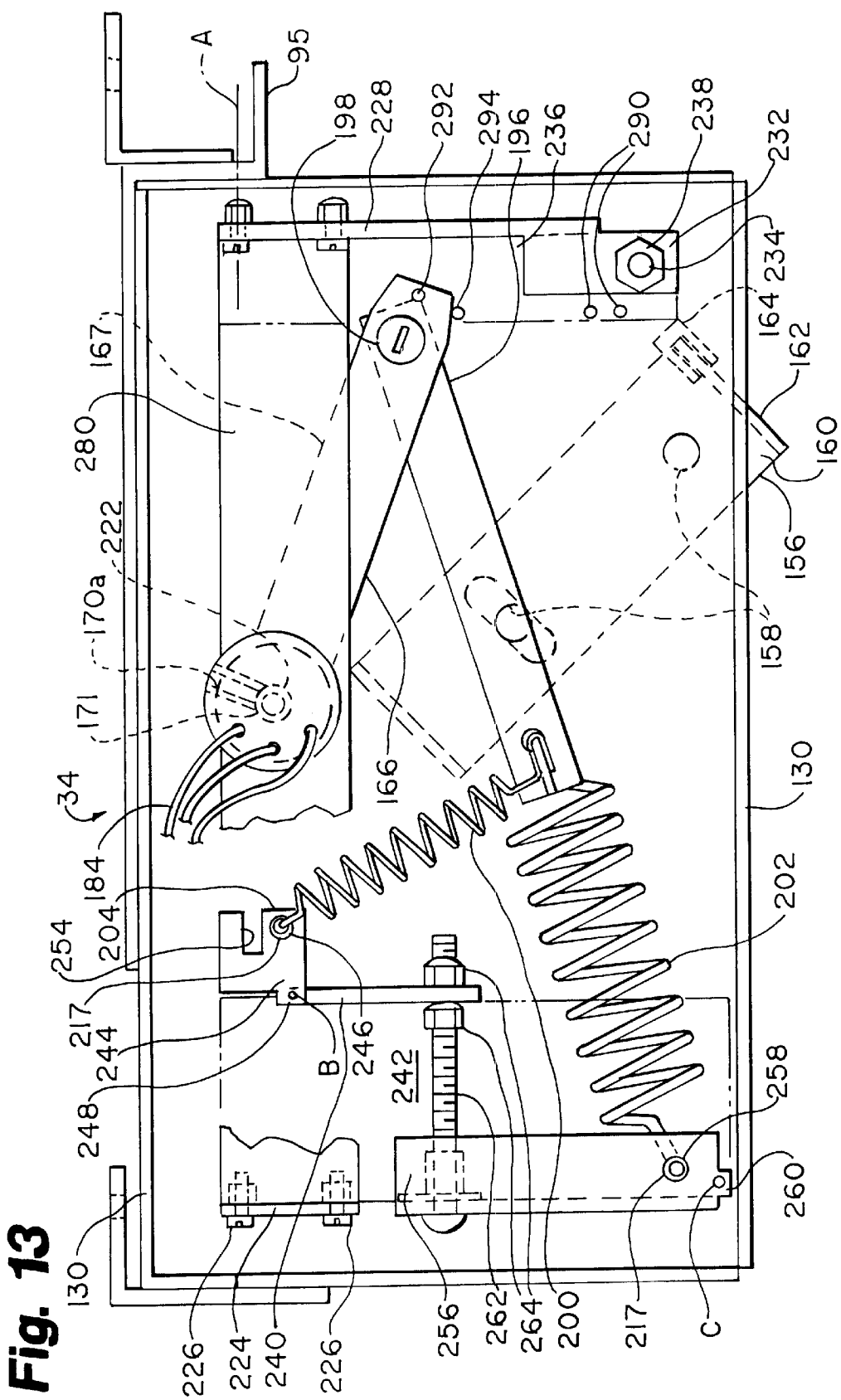
FIG. 13 is a top plan form view of the sensing unit of FIG. 12.
Figure 14:
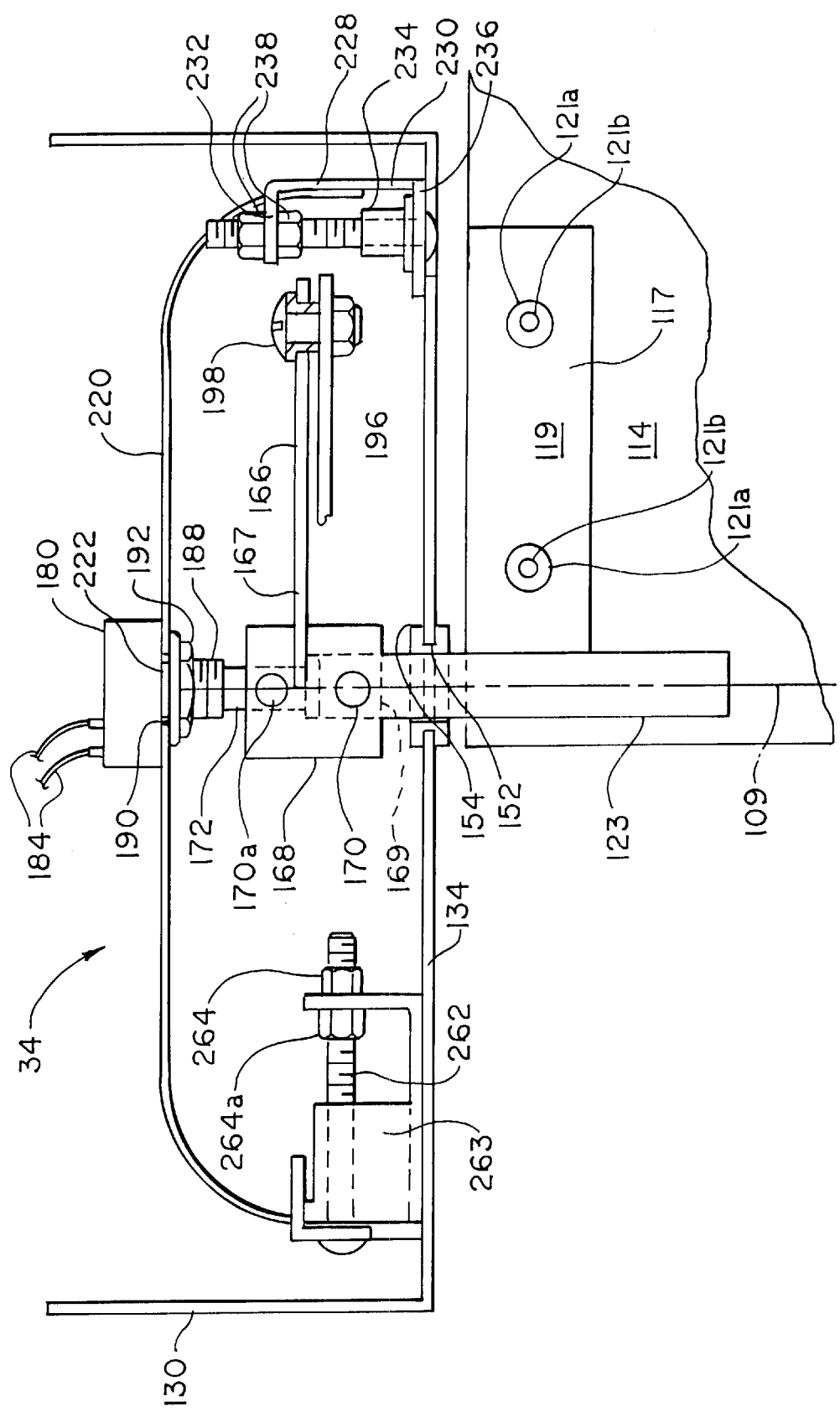
FIG. 14 is a front elevational view of the sensing unit of FIG. 12.

For the next step of the calibration procedure, all the components of the sensing unit 34, as indicated at FIG. 13, are installed with the exception of the light spring 200. The calibrated weight assembly 268 of the calibration jig 35 is positioned as indicated in FIGS. 17–18b, with the distal end 308 of the second arm 306 bearing on the vane 82 at the marked alignment line 310. With the heavy more primary spring 202 installed as indicated in FIG. 13, tension on the spring 202 is adjusted by varying the length of the bolt 262 to rotate the large spring mount 256 about the axis C. Such movement of the large spring mount 256 relative to the fixed mount 240 results in bending of the hinge 260. Proper tension of the spring 202 is achieved when a third known voltage is read out of the sensor 180.

After calibration of the spring 202, the light (or secondary) spring 200 is then adjusted. Tension on the light spring 200 is adjusted by inserting the tool such as a slot screw driver into bend slot 254 of the small spring mount 244. Twisting the tool results in twisting the small spring mount 244 about the axis B as indicated in FIG. 12. This action bends the hinge 248 to permanently position the small spring mount 244 such that a known voltage is read out of the sensor 180.

The foregoing procedure calibrates and levels the air flow to measuring device 10 with respect to the outdoor air intake 12 in which it is installed. The leveling of course is with reference to the surface at the factory on which the outdoor air intake 12 is resting. The level of the surface on which the outdoor intake 12 is resting in the factory may be different from the local level as the outdoor air intake 12 is installed on the building in the field. In order to accurately measure air mass flow, the air flow measuring device 10 must be accurately leveled in the field to replicate the calibration that was achieved in the factory. In order to achieve such leveling, the calibrated weight 286 is installed in the outdoor air intake 12 in the field in precisely the same manner as it was installed at the factory. With the mass 298 exerting a force on the vane 82, the vane 82 is simply leveled using the leveling vernier 266 to obtain the identical voltage readouts that were obtained in the factory calibration procedure for the two springs 200, 202. Performing this step in the field ensures that the vane 82 is leveled with reference to local gravity in exactly the same way as the vane 82 was leveled with reference to local gravity during the calibration procedures performed at the factory.

What is claimed is:

1. A flow measuring device for use with a heating, ventilation and air-conditioning (HVAC) system, comprising:

a vane being positionable in an airstream, the vane adapted to pivot and be supported along a generally vertical margin of the vane, the vane being rotatably positionable between a first minimum air mass flow disposition and a second maximum air mass flow disposition, the vane being biased in the first minimum air mass flow disposition, the disposition of the vane being responsive in part to an impingement of an air mass flow on the vane; and measuring means operably coupled to the vane for measuring the disposition of the vane and for providing an output communication of the vane disposition, said vane disposition having a known relationship to the air mass flow.

2. The flow measuring device of claim 1 wherein an amount of a biasing force exerted on the vane is vane disposition dependent.

3. The flow measuring device of claim 2 wherein the vane disposition dependent biasing force is variable being a minimum when the vane is in the vane first minimum air mass flow disposition, increasing to a maximum at an intermediate vane disposition and decreasing to less than the maximum force at the vane second maximum air mass flow disposition.

4. The flow measuring device of claim 2 wherein the amount of the biasing force exerted on the vane is generated at least in part by the force of gravity.

5. The flow measuring device of claim 2 wherein the amount of the biasing force exerted on the vane is generated at least in part by at least one spring being operably coupled to the vane.

6. The flow measuring device of claim 2 wherein the amount of the biasing force exerted on the vane is generated at least in part by at least two springs acting cooperatively and being operably coupled to the vane.

7. The flow measuring device of claim 3 wherein the amount of the biasing force exerted on the vane is generated at least in part by at least a first and a second spring acting cooperatively and being operably coupled to the vane.

8. A flow measuring device for use with a heating, ventilation and air-conditioning (HVAC) system, comprising:

a vane being positionable in an airstream, the vane being rotatably positionable between a first minimum air mass flow disposition and a second maximum air mass flow disposition, the vane being biased in the first minimum air mass flow disposition, the disposition of the vane being responsive in part to an impingement of an air mass flow on the vane; and measuring means operably coupled to the vane for measuring the disposition of the vane and for providing an output communication of the vane disposition, said vane disposition having a known relationship to the air mass flow;

wherein an amount of a biasing force exerted on the vane is vane disposition dependent;

wherein the vane disposition dependent biasing force is variable being a minimum when the vane is in the vane first minimum air mass flow disposition, increasing to a maximum at an intermediate vane disposition and decreasing to less than the maximum force at the vane second maximum air mass flow disposition;

wherein the amount of the biasing force exerted on the vane is generated at least in part by at least a first and a second spring acting cooperatively and being operably coupled to the vane; and wherein the first spring acts to generate substantially all the biasing force acting on the vane when the vane is in first minimum air mass flow disposition, the first spring and the second spring act to generate substantially all the biasing force acting on the vane when the vane is in an intermediate vane disposition, and the second spring acts to generate substantially all the biasing force acting on the vane when the vane is in the vane second maximum air mass flow disposition.

9. A flow measuring device for use with a heating, ventilation and air-conditioning (HVAC) system, comprising:
- a vane being positionable in an airstream, the vane being rotatably positionable between a first minimum air mass flow disposition and a second maximum air mass flow disposition, the vane being biased in the first minimum air mass flow disposition, the disposition of the vane being responsive in part to an impingement of an air mass flow on the vane;
- measuring means operably coupled to the vane for measuring the disposition of the vane and for providing an output communication of the vane disposition, said vane disposition having a known relationship to the air mass flow;
- wherein an amount of a biasing force exerted on the vane is vane disposition dependent;
- wherein the amount of the biasing force exerted on the vane is generated at least in part by at least two springs acting cooperatively and being operably coupled to the vane; and
- a crank arm fixedly coupled to the vane proximate a crank arm proximal end and a link being pivotally coupled to the crank arm, the link having a link proximal end and a link distal end, the link proximal end being pivotally coupled to the crank arm distal end, a first end of the first spring being coupled to the link proximate the link distal end, and a first end of the second spring being coupled to the link proximate the link distal end.

10. The flow measuring device of claim 9 wherein a second end of the first spring is coupled to a first spring bracket, the first spring bracket being translatable for selective adjusting of a first spring tension, and a second end of the second spring is coupled to a second spring bracket, the second spring bracket being translatable for selective adjusting of a second spring tension.

11. The flow measuring device of claim 6 wherein the first spring and the second spring are coil springs, the first spring and the second spring being open wound.

12. A flow measuring device for use with a heating, ventilation and air-conditioning (HVAC) system, comprising:
- a vane being positionable in an airstream, the vane adapted to pivot and be supported along a generally vertical margin of the vane, the vane being rotatably positionable between a first minimum air mass flow disposition and a second maximum air mass flow disposition, the vane being biased in the first minimum air mass flow disposition, the disposition of the vane being responsive in part to an impingement of an air mass flow on the vane; and
- measuring means operably coupled to the vane for measuring the disposition of the vane and for providing an output communication of the vane disposition, said vane disposition having a known relationship to the air mass flow, wherein the measuring means is axially aligned with a vane pivot axis for measurement of vane rotation about the vane pivot axis.

13. The flow measuring device of claim 12 wherein the measuring means is a rotary potentiometer having a rotatable potentiometer shaft, the potentiometer shaft being directly coupled to the vane for measurement of the vane rotation.

14. A flow measuring device for use with a heating, ventilation and air-conditioning (HVAC) system, comprising:
- a vane being positionable in an airstream, the vane being rotatably positionable between a first minimum air mass flow disposition and a second maximum air mass flow disposition, the vane being biased in the first minimum air mass flow disposition, the disposition of the vane being responsive in part to an impingement of an air mass flow on the vane; and
- measuring means operably coupled to the vane for measuring the disposition of the vane and for providing an output communication of the vane disposition, said vane disposition having a known relationship to the air mass flow, wherein the measuring means is axially aligned with a vane pivot axis for measurement of vane rotation about the vane pivot axis, wherein the measuring means is a rotary potentiometer having a rotatable potentiometer shaft, the potentiometer shaft being directly coupled to the vane for measurement of the vane rotation,
- wherein the rotary potentiometer is self aligning with the vane pivot axis and is substantially free of binding forces that may restrain the free rotation of the vane.

15. A flow measuring device for use with a heating, ventilation and air-conditioning (HVAC) system, comprising:
- a vane being positionable in an airstream, the vane being rotatably positionable between a first minimum air mass flow disposition and a second maximum air mass flow disposition, the vane being biased in the first minimum air mass flow disposition, the disposition of the vane being responsive in part to an impingement of an air mass flow on the vane;
- measuring means operably coupled to the vane for measuring the disposition of the vane and for providing an output communication of the vane disposition, said vane disposition having a known relationship to the air mass flow, wherein the measuring means is axially aligned with a vane pivot axis for measurement of vane rotation about the vane pivot axis; and
- wherein a rotary potentiometer body is supported on a flexible mount, the flexible mount restraining rotation of the rotary potentiometer body and accommodating the free float of the potentiometer to accommodate the rotary potentiometer being self aligning with the vane pivot axis and being substantially free of binding forces that may restrain the free rotation of the vane.

16. A flow measuring device for use with a heating, ventilation and air-conditioning (HVAC) system, comprising:
- a vane being positionable in an airstream, the vane being rotatably positionable between a first minimum air mass flow disposition and a second maximum air mass flow disposition, the vane being biased in the first minimum air mass flow disposition, the disposition of the vane being responsive in part to an impingement of an air mass flow on the vane;
- measuring means operably coupled to the vane for measuring the disposition of the vane and for providing an output communication of the vane disposition, said vane disposition having a known relationship to the air mass flow; and
- wherein the vane has a leading edge, the leading edge being disposed in a recess for shielding the leading edge from an airstream.

17. A flow measuring device for use with a heating, ventilation and air-conditioning (HVAC) system, comprising:

a vane being positionable in an airstream, the vane being rotatably positionable between a first minimum air mass flow disposition and a second maximum air mass flow disposition, the vane being biased in the first minimum air mass flow disposition, the disposition of the vane being responsive in part to an impingement of an air mass flow on the vane;

measuring means operably coupled to the vane for measuring the disposition of the vane and for providing an output communication of the vane disposition, said vane disposition having a known relationship to the air mass flow; and wherein the vane assembly is levelable by selective rotation of the vane assembly about a vane assembly pivot point.

18. A flow measuring for use with a heating, ventilation and air-conditioning (HVAC) system, comprising:

a vane being positionable in an airstream, the vane being rotatably positionable between a first minimum air mass flow disposition and a second maximum air mass disposition, the vane being biased in the first minimum air mass flow disposition, the disposition of the vane being responsive in part to an impingement of an air mass flow on the vane; and measuring means operably coupled to the vane for measuring the disposition of the vane and for providing an output communication of the vane disposition, said vane disposition having a known relationship to the air mass flow and wherein the vane has a first hinge support, the first hinge support bearing substantially all the weight of the vane on the tip of a point to minimize rotational friction of the vane.

19. The flow measuring device of claim 17 wherein the vane is levelable by a calibration weight exerting a rotational force on the vane, the calibration weight causing a known rotation of the vane when the vane is in a level disposition.

20. The flow measuring device of claim 19 wherein the measuring means provides a known output communication of the vane disposition when said vane disposition corresponds to the vane being in the level disposition.

21. A method of leveling a vane, comprising the steps of:

subjecting the vane to a known force, the force tending to induce rotational motion of the vane;

measuring the rotation of the vane responsive to the known rotational force;

comparing the measured rotation of the vane to a known level rotational measurement, the known level rotational measurement being equatable to the vane rotation when the vane is in a level disposition; and positioning the vane to effect the rotation of the vane to achieve a measured rotation of the vane that is substantially equal to the known level rotational measurement.

22. A method of leveling a vane of claim 21, further comprising the step of:

generating the known force that tends to induce rotational motion of the vane by suspending a calibrated weight from a cable, the cable having a first end operably coupled to the vane.

23. A method of leveling a vane of claim 21, further comprising the step of:

providing a potentiometer for measuring the rotation of the vane responsive to the known rotational force.

24. A flow measuring method for use with a heating, ventilation and air-conditioning (HVAC) system, the method comprising the steps of:

positioning a vane in an airstream, the vane being rotatably positionable between a first minimum air mass flow disposition and a second maximum air mass flow disposition;

biasing the vane in the first minimum air mass flow disposition;

operably coupling measuring means to the vane for measuring the disposition of the vane, the disposition of the vane being responsive at least in part to an impingement of an air mass flow on the vane; and providing an output communication related to the vane disposition, said vane disposition having a known relationship to the air mass flow.

25. The flow measuring method of claim 24 further including the step of:

generating the biasing force exerted on the vane at least in part by the force of gravity.

26. The flow measuring method of claim 24 further including the step of:

generating the biasing force exerted on the vane at least in part by at least one spring being operably coupled to the vane.

27. The flow measuring method of claim 24 further including the step of:

generating the biasing force exerted on the vane at least in part by at least two springs acting cooperatively and being operably coupled to the vane.

28. The flow measuring method of claim 27 further including the steps of:

the first spring acting to generate substantially all the biasing force acting on the vane when the vane is in first minimum air mass flow disposition;

the first spring and the second spring acting to generate substantially all the biasing force acting on the vane when the vane is in an intermediate vane disposition; and the second spring acting to generate substantially all the biasing force acting on the vane when the vane is in the vane second maximum air mass flow disposition.

29. The flow measuring method of claim 24 further including the step of:

axially aligning the measurement means with a vane pivot axis for measurement of vane rotation about the vane pivot axis.

30. The flow measuring method of claim 29 further including the step of:

providing a rotary potentiometer having a rotatable potentiometer shaft, the potentiometer shaft being directly coupled to the vane for measurement of the vane rotation.

31. The flow measuring method of claim 30 further including the steps of:

the rotary potentiometer self aligning with the vane pivot axis; and substantially freeing the rotary potentiometer of binding forces that may restrain the free rotation of the vane.

32. The flow measuring method of claim 27 further including the step of ensuring that the first and second springs are under substantially the same tension at any given disposition of the vane from cycle to cycle of the vane.

33. The method of leveling a vane of claim 22 further comprising the step of subjecting the vane to the known force by means of a known mass acting through a fulcrum on the vane.

34. The method of leveling a vane of claim 21 further comprising the step of positioning the vane by means of a turnbuckle leveling vernier acting on the vane.

35. The method of leveling a vane of claim 34 further comprising the step of rotating the leveling vernier to pivot the vane about a pivot point.

36. An air flow measuring device, comprising:
a vane being rotatable responsive to an air mass flow, the vane adapted to pivot and be supported along a generally vertical margin of the vane; and
a sensing unit being operably coupled to the vane, the sensing unit including a sensor for sensing position of the vane in an airstream, the sensing unit exerting a rotational bias on the vane, the bias acting in opposition to a rotation of the vane, the vane rotation of the vane being responsive to the air mass flow.

37. An air flow measuring device comprising:
a vane being positionable in an airstream, the vane adapted to pivot and be supported along a generally vertical margin of the vane, the vane being rotatably positionable between a first minimum air mass flow disposition and a second maximum air mass flow disposition, the vane being biased in the first minimum air mass flow disposition, the disposition of the vane being responsive in part to an impingement of an air mass flow on the vane; and
a sensing unit being operably coupled to the vane, the sensing unit including a sensor for sensing position of the vane in an airstream, the sensing unit exerting a rotational bias on the vane, the bias acting in opposition to a rotation of the vane, the vane rotation of the vane being responsive to the air mass flow, wherein the sensing unit sensor is fixedly supported on a sensor mount and operably coupled to the vane for sensing rotation of the vane relative the sensor and including an adjuster for effecting fine adjustment of the sensor relative to the vane.

38. An air flow measuring device comprising:
a vane being positionable in an airstream, the vane being rotatably positionable between a first minimum air mass flow disposition and a second maximum air mass flow disposition, the vane being biased in the first minimum air mass flow disposition, the disposition of the vane being responsive in part to an impingement of an air mass flow on the vane; and
a sensing unit being operably coupled to the vane, the sending unit including a sensor for sensing position of the vane in an airstream, the sensing unit exerting a rotational bias on the vane, the bias acting in opposition to a rotation of the vane, the vane rotation of the vane being responsive to the air mass flow, wherein the sensing unit sensor is fixedly supported on a sensor mount and operably coupled to the vane for sensing rotation of the vane relative the sensor and including an adjuster for effecting fine adjustment of the sensor relative to the vane,
wherein the sensing unit sensor mount is selectively twistable, the twist imparting a selected amount of rotation to the sensor.

39. An air flow measuring device, comprising:
a vane being rotatable responsive to an air mass flow; and
a sensing unit being operably coupled to the vane, the sensing unit including a sensor for sensing position of the vane in an airstream, the sensing unit exerting a rotational bias on the vane, the bias acting in opposition to a rotation of the vane, the vane rotation of the vane being responsive to the air mass flow,
wherein a bias is imposed on the vane, the bias varying in a non-linear relationship with rotation of the vane from a minimum air mass flow disposition to a maximum air mass flow disposition.

40. The air flow measuring device of claim 39 wherein the bias is imposed in part by a first spring operably coupled to the vane, the first spring being coupled at a first end to a spring mount, the spring mount having a deformable hinge for adjusting the tension on the first spring.

41. The air flow measuring device of claim 40 wherein the bias is imposed in part by a second spring operably coupled to the vane, the second spring being coupled at a first end to a spring mount, the spring mount having a deformable hinge for adjusting the tension on the second spring.

42. The air flow measuring device of claim 41 wherein the first and second springs are operably coupled to the vane by a shiftable lever arm, shifting of the lever arm effecting the varying bias exerted on the vane.

43. The air flow measuring device of claim 36 wherein the vane is levelable by means of a leveling vernier operably coupled to the vane.

44. The air flow measuring device of claim 43 wherein a vane level condition is indicated by a known sensor output signal, the known sensor output signal being responsive to a known rotational being force exerted on the vane.

45. The air flow measuring device of claim 44 wherein the known rotational force is exerted by a known mass.

46. The air flow measuring device of claim 45 wherein the known mass acts on the vane through a lever disposed on a fulcrum.

* * * * *